(12) United States Patent
Takeda et al.

(10) Patent No.: US 11,215,290 B2
(45) Date of Patent: Jan. 4, 2022

(54) NON-RETURN VALVE MECHANISM AND ONE-WAY VALVE DEVICE

(71) Applicant: NERIKI VALVE CO., LTD., Hyogo (JP)

(72) Inventors: Masaru Takeda, Hyogo (JP); Kazuyuki Miyata, Hyogo (JP)

(73) Assignee: NERIKI VALVE CO., LTD., Hyogo (JP)

( * ) Notice: Subject to any disclaimer, the term of this patent is extended or adjusted under 35 U.S.C. 154(b) by 28 days.

(21) Appl. No.: 16/208,762

(22) Filed: Dec. 4, 2018

(65) Prior Publication Data

US 2019/0178399 A1 Jun. 13, 2019

(30) Foreign Application Priority Data

Dec. 8, 2017 (JP) .............................. JP2017-236505

(51) Int. Cl.
*F16K 15/02* (2006.01)
*F16K 15/18* (2006.01)
(Continued)

(52) U.S. Cl.
CPC ............ *F16K 15/025* (2013.01); *F16K 15/18* (2013.01); *F17C 13/04* (2013.01); *F16K 27/0209* (2013.01); *F16K 31/1221* (2013.01); *F16K 31/60* (2013.01); *F17C 2205/0329* (2013.01); *F17C 2205/0332* (2013.01); (Continued)

(58) Field of Classification Search
CPC ..... F16K 15/025; F16K 31/1221; F17C 13/04
See application file for complete search history.

(56) References Cited

U.S. PATENT DOCUMENTS 2,335,814 A * 11/1943 Stevenson ............. F16K 11/105
137/111
2006/0196558 A1* 9/2006 Feldman ............. F16K 31/1226
137/556

FOREIGN PATENT DOCUMENTS

EP 2453333 A1 5/2012
EP 3081843 A1 10/2016
(Continued)

OTHER PUBLICATIONS

Extended European Search Report issued in European Patent Application No. 18210826.6, dated Apr. 11, 2019 (8 pages).

*Primary Examiner* — Reinaldo Sanchez-Medina
*Assistant Examiner* — Nicole Gardner
(74) *Attorney, Agent, or Firm* — Nakanishi IP Associates, LLC

(57) ABSTRACT

A one-way valve device or a non-return valve mechanism in the valve device provides a higher retaining residual pressure without upsizing. A non-return valve cassette in a consumption valve device regulates gas flow. The cassette includes a check valve movable forward and backward between a valve-closed position and a valve-open position in an outlet secondary flow channel and movable backward to the valve-open position under pressure of the gas flowing upstream, and a first coil spring with a spring force biasing the check valve upstream. The first coil spring permits the check valve to move downstream against the upstream biasing when an upstream pressure is a predetermined pressure or greater. The check valve includes a downstream end smaller than an upstream end in an area communicating with an upstream space at the valve-closed position.

10 Claims, 15 Drawing Sheets

(51) Int. Cl.
*F17C 13/04* (2006.01)
*F16K 27/02* (2006.01)
*F16K 31/122* (2006.01)
*F16K 31/60* (2006.01)

(52) U.S. Cl.
CPC ............... *F17C 2205/0335* (2013.01); *F17C 2205/0338* (2013.01); *F17C 2205/0341* (2013.01); *F17C 2205/0385* (2013.01); *F17C 2227/048* (2013.01)

(56) References Cited

FOREIGN PATENT DOCUMENTS

| | | | | |
|---|---|---|---|---|
| EP | 3163137 A1 | 5/2017 | | |
| GB | 565291 A | * 11/1944 | ........... | F16K 15/025 |
| JP | 2002-49427 A | 2/2002 | | |
| JP | 2009-193312 A | 8/2009 | | |

* cited by examiner

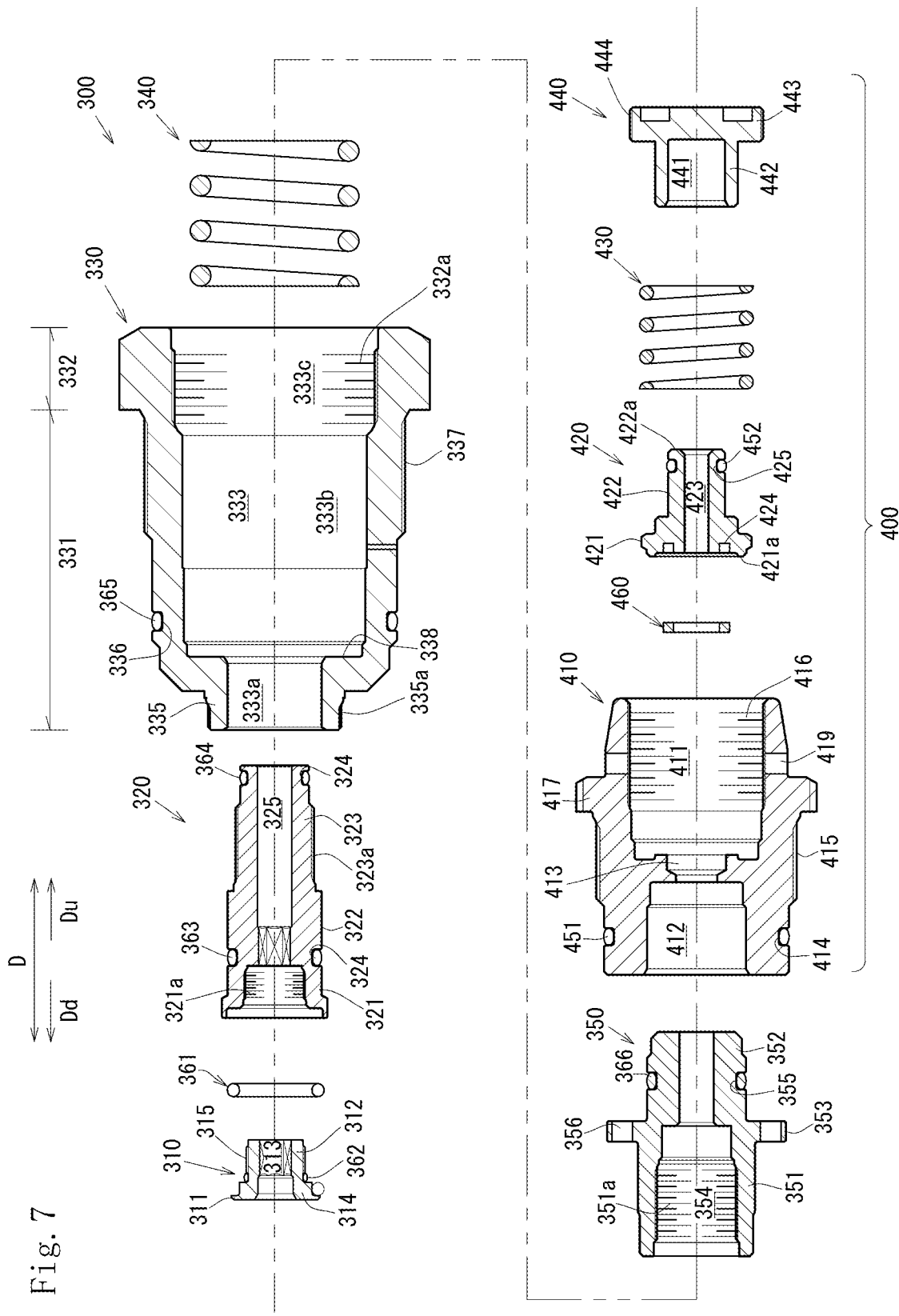

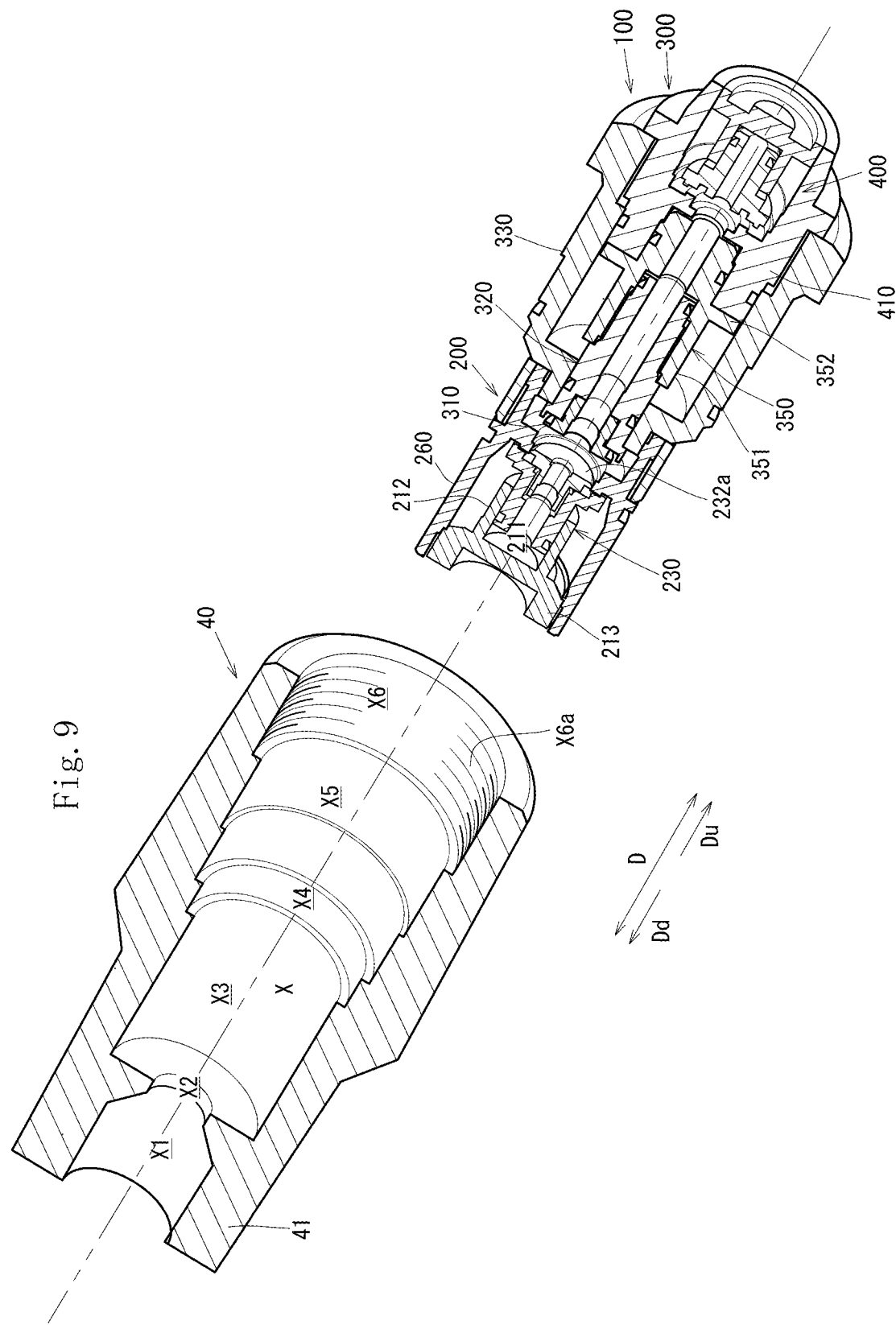

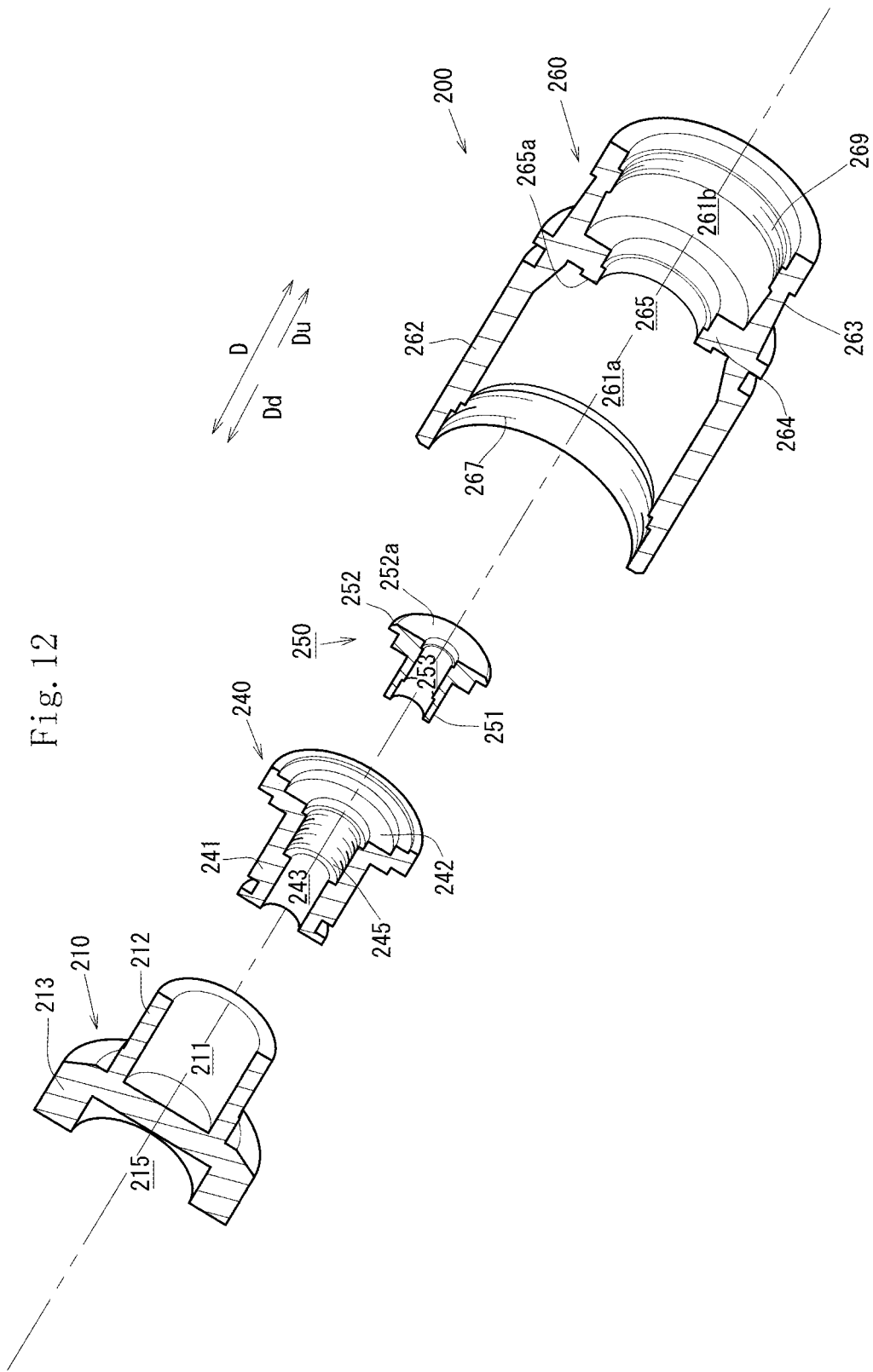

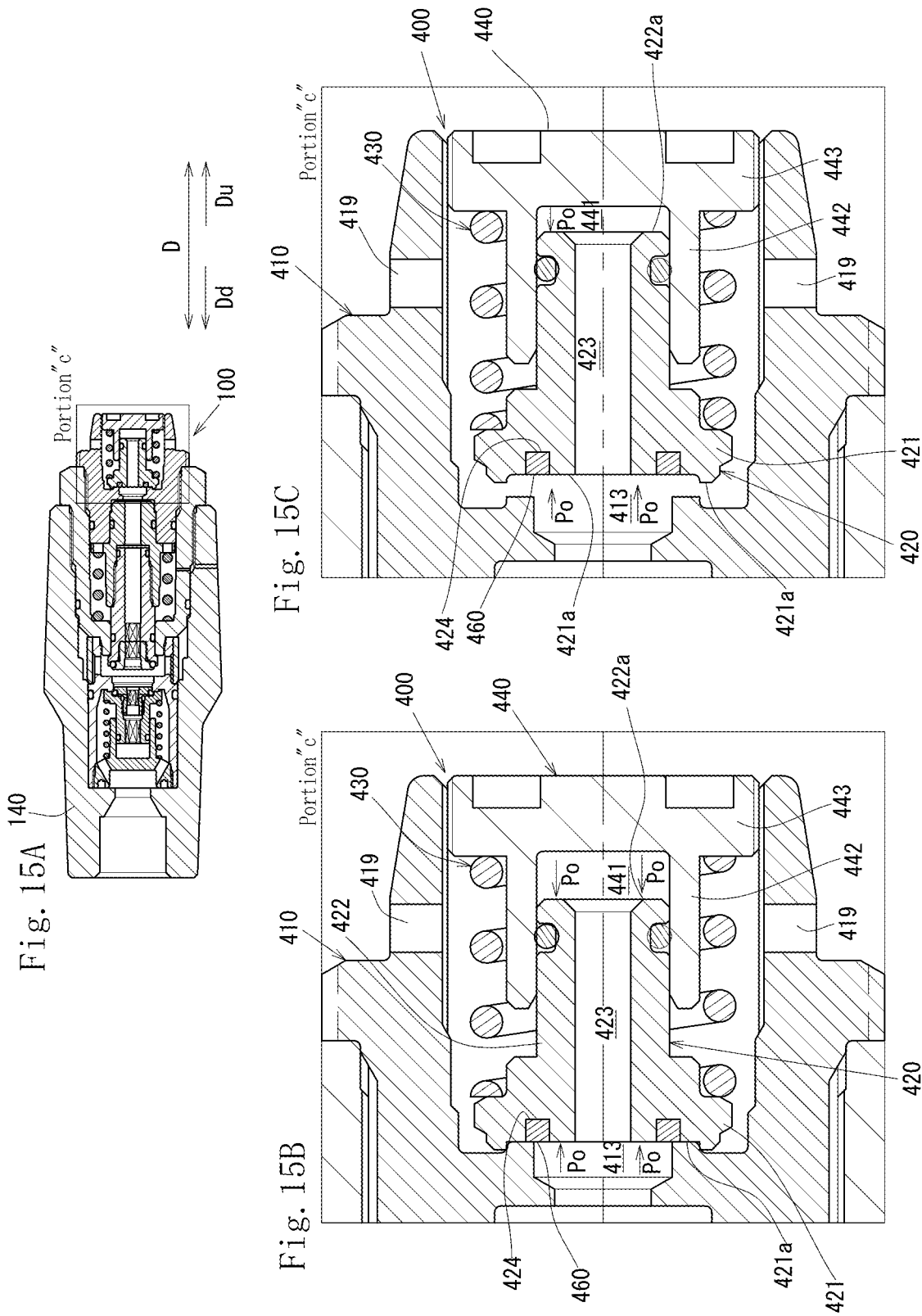

NON-RETURN VALVE MECHANISM AND ONE-WAY VALVE DEVICE

BACKGROUND OF INVENTION

Field of the Invention

The present invention relates to a one-way valve device mountable on for example a bundle of cylinders and including a non-return valve mechanism for retaining the residual pressure, and to a non-return valve mechanism mountable on such a one-way valve device.

Background Art

A valve device with an on-off valve, which allows flow of a fluid such as a gas and is switchable between an open state and a sealed state, may typically include a non-return valve mechanism, which regulates flow of a fluid unlike an on-off valve. One such non-return valve mechanism is a residual pressure retaining valve mechanism, with which a gas with a predetermined pressure can remain in a container (refer to Patent Literature 1).

As described in Patent Literature 1, the non-return valve mechanism includes a regulator valve movable forward and backward between a valve-closed position and a valve-open position, and a biasing member that biases the regulator valve toward the valve-closed position. The pressure of the fluid flowing upstream flowing through the flow channel (upstream pressure) and the spring force of the biasing member move the regulator valve forward or backward to regulate the fluid flow.

In detail, as the fluid is consumed in the container with the valve device including the non-return valve mechanism described in Patent Literature 1 in the valve-open state, the remaining amount of the fluid in the container decreases. When the upstream pressure decreases to a predetermined pressure, the valve element moves to the valve-closed position and is closed, allowing the fluid with a predetermined pressure to remain in the container.

However, the container valve described in Patent Literature 1 with the non-return valve mechanism uses the spring force of the biasing member to move the regulator valve to the valve-closed position. To increase the predetermined pressure of the fluid remaining in the container, the container valve may include a larger spring with a larger spring force. This prevents the non-return valve mechanism and the container valve from being smaller.

CITATION LIST

Patent Literature

Patent Literature 1: Japanese Unexamined Patent Application Publication No. 2002-49427

SUMMARY OF INVENTION

Technical Problem

One or more aspects of the present invention are directed to a one-way valve device that provides a higher retaining residual pressure without upsizing, or a non-return valve mechanism mountable on the one-way valve device.

Solution to Problem

One aspect of the present invention provides a non-return valve mechanism mountable on a one-way valve device to regulate flow of a fluid. The one-way valve device includes a flow channel in which the fluid flows and an on-off valve located in a middle portion of the flow channel and switchable between an open state and a closed state. The non-return valve mechanism is mountable in a mounting space located downstream from the on-off valve in the flow channel of the one-way valve device. The non-return valve mechanism includes a regulator valve movable forward and backward between a valve-closed position and a valve-open position in the mounting space, and movable backward to the valve-open position under pressure of the fluid flowing upstream, and a biasing member with a spring force to bias the regulator valve in a valve-closing direction from the valve-open position to the valve-closed position, and to permit the regulator valve to move in a valve-opening direction from the valve-closed position to the valve-open position against the biasing in the valve-closing direction when the fluid flowing upstream has a predetermined pressure or greater. The regulator valve includes, in an area of the regulator valve at the valve-closed position communicating with an upstream space, a valve-closing directional end for receiving a pressure in the valve-closing direction and having a smaller projected area in an opening and closing direction than a valve-opening directional end for receiving a pressure in the valve-opening direction.

Another aspect of the present invention provides a one-way valve device including a flow channel in which a fluid flows and an on-off valve located in a middle portion of the flow channel and switchable between an open state and a closed state. The device includes the non-return valve mechanism according to the above aspect that regulates flow of the fluid and is mounted in the mounting space.

The fluid may be a gas, a liquid, or a gel.

The valve-open position may be any position allowing the fluid to flow and reach the regulator valve that moves backward under the pressure of the fluid flowing upstream against the spring force of the biasing member, irrespective of whether the regulator valve is stationary.

The one-way valve device may be, for example, a valve mountable on a pipe (a valve for a bundle), or may be a valve mountable on a container. More specifically, the one-way valve device may be mounted on a pipe connected to a bundle of cylinders, or may be mounted on a container, such as a cylinder. The one-way valve device regulates the flow of a fluid in one direction, which may either be the direction in which the fluid is consumed or the direction in which the fluid is supplied.

Being upstream and downstream above refer to being upstream and downstream in the regulated flow in one direction.

The area of the regulator valve at the valve-closed position communicating with the upstream space may be at least exposed to a space communicating with the upstream space in the valve-closed state in which the regulator valve is at the valve-closed position. In the valve-closed state, this area does not communicate with the downstream space.

The opening and closing direction is the combination of the valve-opening direction and the valve-closing direction, or in other words, the forward and backward directions of the regulator valve.

The valve-opening directional end for receiving the pressure in the valve-opening direction is a surface facing in the valve-opening direction and includes a surface orthogonal to or intersecting with the valve-opening direction (opening and closing direction).

The valve-closing directional end for receiving the pressure in the valve-closing direction is a surface facing in the valve-closing direction and includes a surface orthogonal to or intersecting with the valve-closing direction (opening and closing direction).

For a surface orthogonal to the opening and closing direction, the projected area in the opening and closing direction is the area of this surface. For a surface intersecting with the opening and closing direction, the projected area is the area of the surface viewed in the opening and closing direction, or more specifically, the area projected in the opening and closing direction.

Each of the valve-opening directional end and the valve-closing directional end may include one or more surfaces. The projected area for a plurality of surfaces is the sum total of the projected areas of the surfaces.

The structure according to the above aspects of the invention provides a higher retaining residual pressure without upsizing.

More specifically, the structure according to the above aspects includes the regulator valve movable forward and backward between the valve-closed position and the valve-open position in the mounting space, and movable backward to the valve-open position under the pressure of the fluid flowing upstream. The structure according to the aspects also includes the biasing member with a spring force to bias the regulator valve in the valve-closing direction from the valve-open position to the valve-closed position, and to permit the regulator valve to move in the valve-opening direction from the valve-closed position to the valve-open position against the biasing in the valve-closing direction when the fluid flowing upstream has a predetermined pressure or greater. The spring force of the biasing member in the valve-closing direction reliably closes the valve at the valve-closed position. Conversely, when the regulator valve receives the predetermined pressure or greater of the fluid flowing upstream (hereafter, upstream pressure), the regulator valve moves toward the valve-open position against the spring force of the biasing member to cause the fluid to flow.

When the upstream pressure decreases to the predetermined pressure, the spring force of the biasing member biases the regulator valve to the valve-closed position to close the valve, allowing the fluid with the predetermined pressure to remain within the cylinders in the bundle.

In this state, the valve-opening directional end of the regulator valve receives the pressure in the valve-opening direction. The biasing member is to move the regulator valve to the valve-closed position against the pressure in the valve-opening direction. However, the valve-closing directional end having a smaller area than the valve-opening directional end receives the pressure in the valve-closing direction.

In this manner, the regulator valve receives pressures in opposite directions, or the pressure in the valve-opening direction to the valve-opening directional end and the pressure in the valve-closing direction to the valve-closing directional end, which cancel each other. The regulator valve thus receives the differential pressure between the pressure in the valve-opening direction to the valve-opening directional end and the pressure in the valve-closing direction to the valve-closing directional end. With the valve-closing directional end smaller than the valve-opening directional end in the projected area, the regulator valve receives the pressure obtained by subtracting the pressure in the valve-closing direction from the pressure in the valve-opening direction, or specifically the differential pressure in the valve-opening direction. Thus, the biasing member with a spring force against the differential pressure in the valve-opening direction can move the regulator valve to the valve-closed position. The biasing member may simply have a spring force against the differential pressure in the valve-opening direction. The biasing member may have a smaller spring force than a biasing member including the regulator valve with no valve-closing directional end, or the biasing member that simply receives the pressure in the valve-opening direction. The biasing member may thus be smaller. This structure provides a higher retaining residual pressure without upsizing.

The structure according to the above aspects of the invention may further include a support that supports the regulator valve in a movable manner. The biasing member may bias the regulator valve in the valve-closing direction under a reaction force from the support. The regulator valve may include a seal that seals a smaller-diameter channel portion of the flow channel at the valve-closed position, and a cylinder located downstream from the seal, and have a through-hole extending in the opening and closing direction through the seal and the cylinder. The support may include a cylindrical accommodating portion accommodating the cylinder in a manner to move the cylinder forward and backward. The valve-opening directional end may include an upstream end of the seal, and the valve-closing directional end may include a downstream end of the cylinder accommodated in the cylindrical accommodating portion.

In the above aspects of the invention, the cylindrical accommodating portion in the support accommodates the cylinder in the regulator valve in a manner to move the cylinder forward and backward, and the biasing member biases the regulator valve in the valve-closing direction under the reaction force from the support. This structure enables the regulator valve to move forward and backward accurately in the opening and closing direction.

The valve-opening directional end includes an upstream end of the seal, and the valve-closing directional end includes a downstream end of the cylinder accommodated in the cylindrical accommodating portion. This structure may be smaller than the structure with, for example, an additional valve-opening directional end on the seal.

In the above aspects of the invention, the support may have a communication path communicating between an upstream end and a downstream end of the support.

The structure according to the above aspects of the invention allows a sufficiently high rate of fluid flow under the pressure of the fluid flowing upstream near the predetermined residual pressure to be retained (hereafter, retaining pressure).

More specifically, when the fluid remaining in the container decreases to reduce the upstream pressure to near the predetermined pressure as described above, the spring force of the biasing member moves the regulator valve toward the valve-closed position to reduce the flow channel area. The reduced flow channel area can cause an insufficient flow rate of fluid, which may stop the equipment using the fluid. However, the flow area remains sufficient because the fluid can flow through the communication path in the support. This achieves a sufficiently high flow rate under the upstream pressure near the retaining pressure.

The upstream pressure near the retaining pressure may be an upstream pressure decreased from a high pressure to near the retaining pressure due to fluid consumption or an upstream pressure that is near the retaining pressure from the beginning.

The structure according to the above aspects of the invention may further include a cassette frame mounted in the mounting space. The cassette frame may accommodate the regulator valve and the biasing member.

The structure according to the above aspects of the invention allows the non-return valve mechanism to have the cassette structure, and the one-way valve device to easily achieve a sufficiently high flow rate under the upstream pressure near the retaining pressure.

More specifically, the non-return valve mechanism can have the cassette structure using the cassette frame accommodating the regulator valve and the biasing member.

Further, the non-return valve mechanism with the cassette structure is mounted in the mounting space to easily form the one-way valve device including the non-return valve mechanism.

In the above aspects of the invention, the non-return valve mechanism may be mounted together with a pressure reduction valve mechanism and a safety valve mechanism in the mounting space.

The structure according to the above aspects of the invention allows the pressure reduction valve to reduce the fluid pressure to a predetermined pressure and regulate the fluid flow. This structure allows the one-way valve device for high pressures to reliably retain the residual pressure at the predetermined pressure without upsizing, and achieves a sufficiently high flow rate under the upstream pressure near the predetermined pressure.

If an abnormality in the pressure reduction valve mechanism insufficiently reduces the fluid pressure, the safety valve mechanism prevents damage by allowing the insufficiently pressure-reduced fluid to flow in a secondary pipe connected to the one-way valve device including the non-return valve mechanism.

In the above aspects of the invention, the safety valve mechanism may include a safety valve movable forward and backward between a safety valve-closed position and a safety valve-open position in the mounting space, and movable backward to the safety valve-open position under overpressure of the fluid flowing upstream, and a safety valve biasing member with a spring force to bias the safety valve in a safety valve-closing direction from the safety valve-open position to the safety valve-closed position, and to permit the safety valve to move in a safety valve-opening direction from the safety valve-closed position to the safety valve-open position against the biasing in the safety valve-closing direction when the fluid flowing upstream has a predetermined overpressure or greater. The safety valve may include, in its area communicating with an upstream space at the safety valve-closed position, a safety valve-closing directional end for receiving a pressure in the safety valve-closing direction and having a smaller area than a safety valve-opening directional end for receiving a pressure in the safety valve-opening direction.

Being upstream and downstream above refer to being upstream and downstream in the fluid flow during the operation of the safety valve.

The area of the safety valve at the safety valve-closed position communicating with the upstream space may be at least exposed to a space communicating with the upstream space in the safety valve-closed state in which the safety valve is at the safety valve-closed position. In the safety valve-closed state, this area does not communicate with the downstream space.

The opening and closing direction is the combination of the safety valve-opening direction and the safety valve-closing direction, or in other words, the forward and backward directions of the safety valve.

The safety valve-opening directional end for receiving the pressure in the safety valve-opening direction is a surface facing in the safety valve-opening direction and includes a surface orthogonal to or intersecting with the safety valve-opening direction (opening and closing direction).

For a surface orthogonal to the opening and closing direction, the projected area in the opening and closing direction is the area of this surface. For a surface intersecting with the opening and closing direction, the projected area is the area of the surface viewed in the opening and closing direction, or more specifically, the area projected in the opening and closing direction.

Each of the safety valve-opening directional end and the safety valve-closing directional end may include one or more surfaces. The projected area for a plurality of surfaces is the sum total of the projected areas of the surfaces.

The structure according to the above aspects of the invention increases the flow rate of the safety valve without upsizing the entire apparatus.

More specifically, the structure according to the above aspects includes the safety valve movable forward and backward between the safety valve-closed position and the safety valve-open position in the mounting space, and movable backward to the safety valve-open position under the overpressure of the fluid flowing upstream. The structure according to the above aspects also includes the safety biasing member with a spring force to bias the safety valve in the safety valve-closing direction from the safety valve-open position to the safety valve-closed position, and to permit the safety valve to move in the safety valve-opening direction from the safety valve-closed position to the safety valve-open position against the biasing in the safety valve-closing direction when the fluid flowing upstream has the predetermined overpressure or greater. In the valve-closed state, the spring force of the safety biasing member in the safety valve-closing direction can maintain the safety valve at the safety valve-closed position.

Conversely, when the safety valve receives the predetermined overpressure (hereafter, upstream overpressure) or greater from the fluid flowing upstream, the structure according to the above aspects allows the safety valve to move toward the safety valve-open position against the spring force of the safety biasing member to release the fluid.

In this state, the safety valve-opening directional end of the safety valve receives the pressure in the safety valve-opening direction. The safety biasing member is to hold the safety valve at the safety valve-closed position against the pressure in the safety valve-opening direction. However, the safety valve-closing directional end having a smaller area than the safety valve-opening directional end receives the pressure in the safety valve-closing direction.

In this manner, the safety valve receives the overpressures in opposite directions, or the overpressure in the safety valve-opening direction to the safety valve-opening directional end and the overpressure in the safety valve-closing direction to the safety valve-closing directional end, which cancel each other. The safety valve thus receives the differential pressure between the overpressure in the safety valve-opening direction to the safety valve-opening directional end and the overpressure in the safety valve-closing direction to the safety valve-closing directional end.

In this state, the safety valve-closing directional end, which is smaller than the safety valve-opening directional end in the projected area, receives the overpressure obtained by subtracting the overpressure in the safety valve-closing direction from the overpressure in the safety valve-opening direction. More specifically, the safety valve receives the differential pressure in the safety valve-opening direction. Thus, the safety biasing member with a spring force against the differential pressure in the safety valve-opening direction can hold the safety valve at the safety valve-closed position.

The safety biasing member thus simply has a spring force against the differential pressure in the safety valve-opening direction. The safety biasing member may have a smaller spring force than a safety biasing member including the safety valve with, for example, no safety valve-closing directional end, or the safety biasing member that simply receives the overpressure in the safety valve-opening direction. This structure increases the flow rate of the safety valve without upsizing the entire apparatus.

Advantageous Effects

The aspects of the present invention provide a one-way valve device that provides a higher retaining residual pressure without upsizing, or a non-return valve mechanism mountable on the one-way valve device.

BRIEF DESCRIPTION OF THE DRAWINGS

FIG. 7 is an exploded cross-sectional view of a pressure reduction safety valve cassette.
FIG. 9 is a cross-sectional perspective view of the combination valve mechanism yet to be mounted.
FIG. 12 is an exploded cross-sectional perspective view of the non-return valve cassette.
FIGS. 15A, 15B, and 15C are diagrams describing a safety valve mechanism in the pressure reduction safety valve cassette.

DETAILED DESCRIPTION

A consumption valve device 1 used for fluid consumption according to an embodiment of the invention will now be described with reference to FIGS. 1 to 15C.

Figure 1:
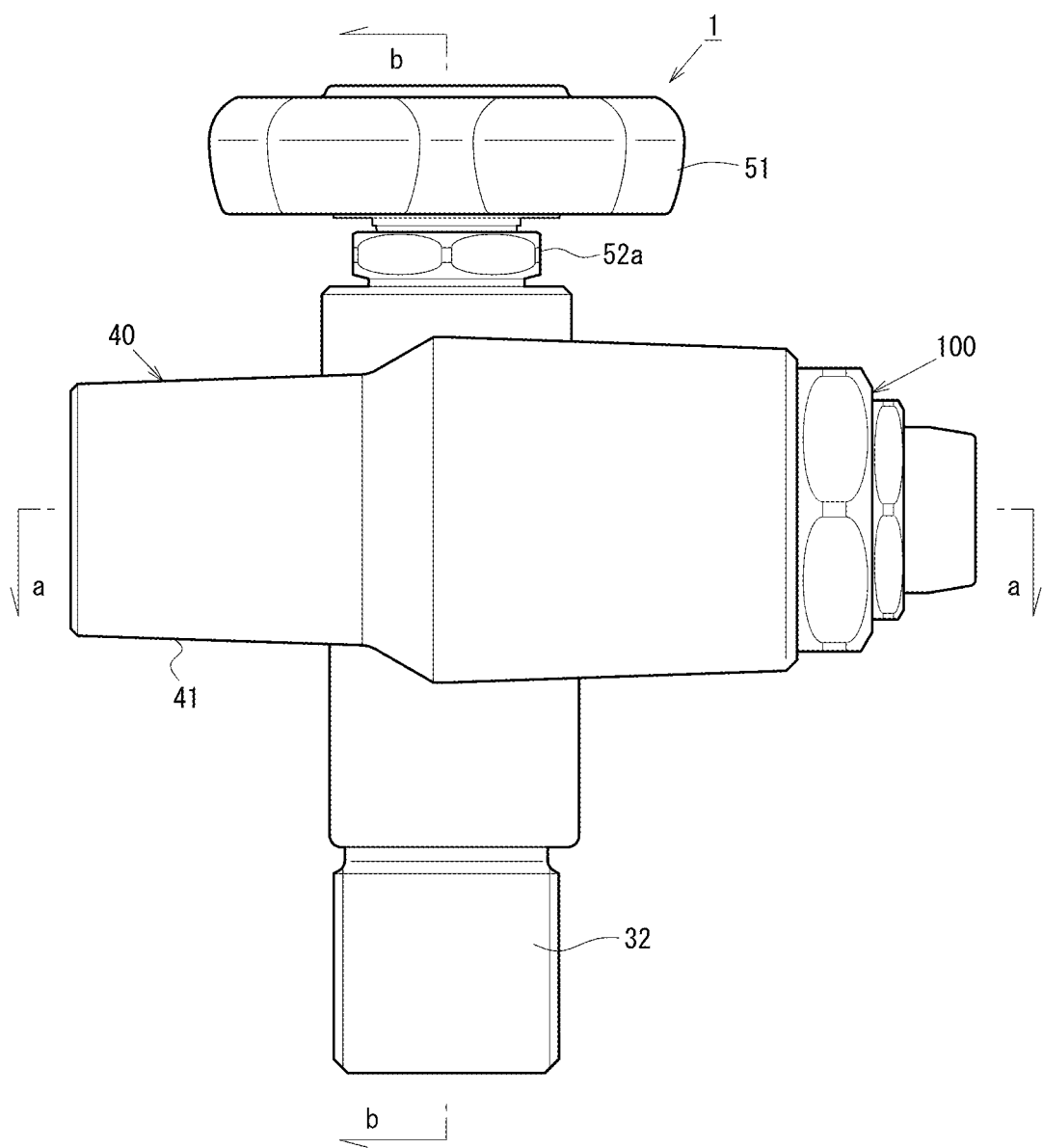
FIG. 1 is a front view of a consumption valve device.
Figure 2:
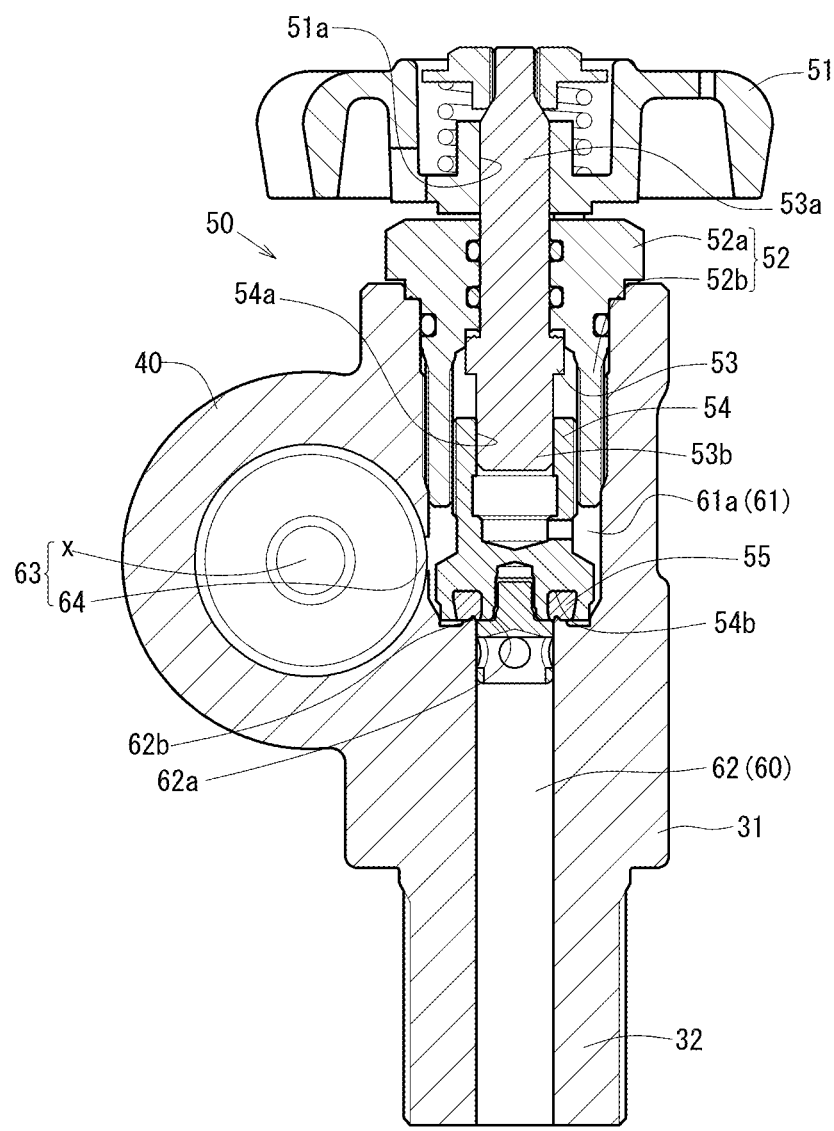
FIG. 2 is a cross-sectional view of the consumption valve device taken along line b-b.
Figure 3:
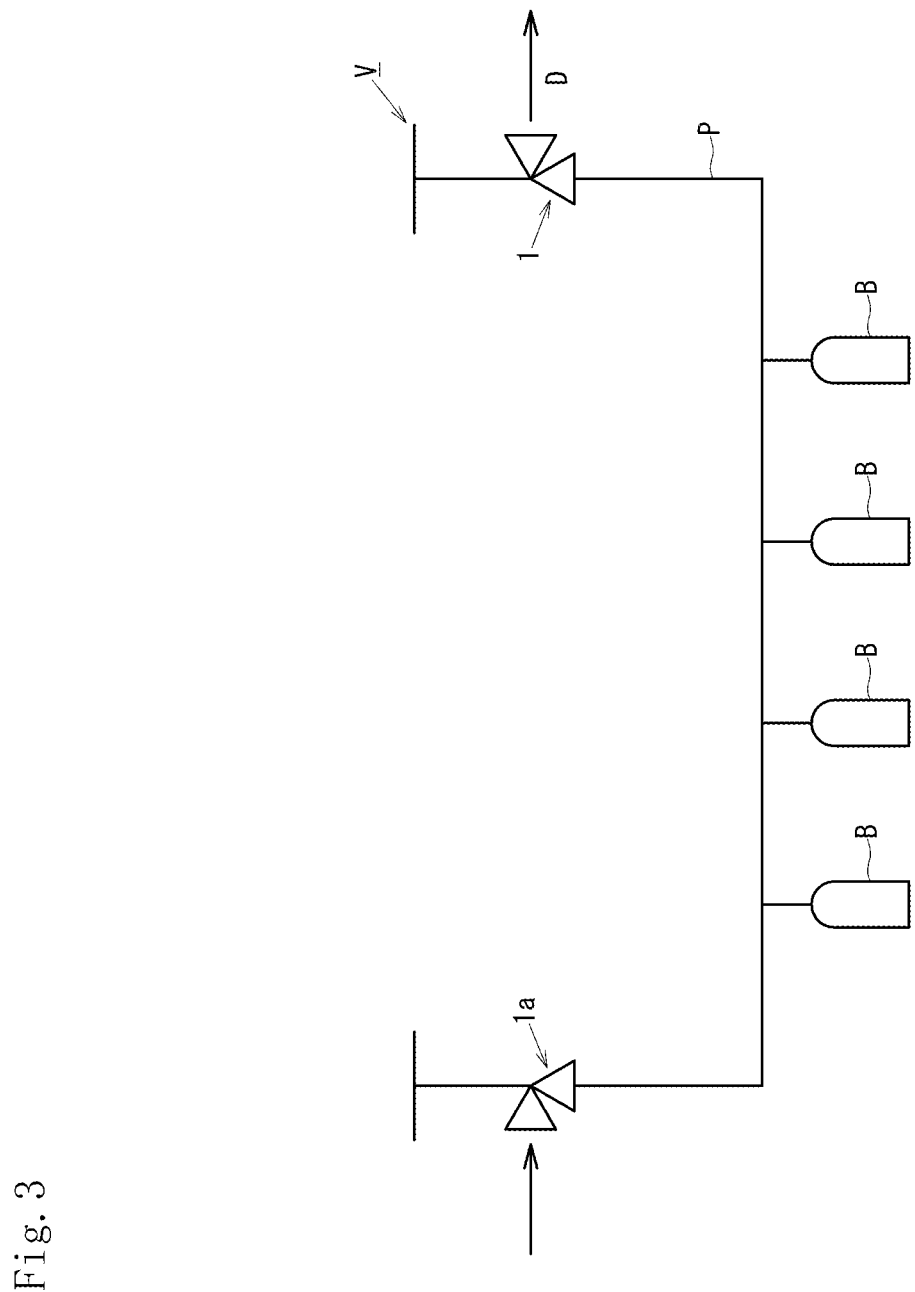
FIG. 3 is a schematic diagram of a bundle of cylinders on which the consumption valve device is mounted.
Figures 4A, 4B:
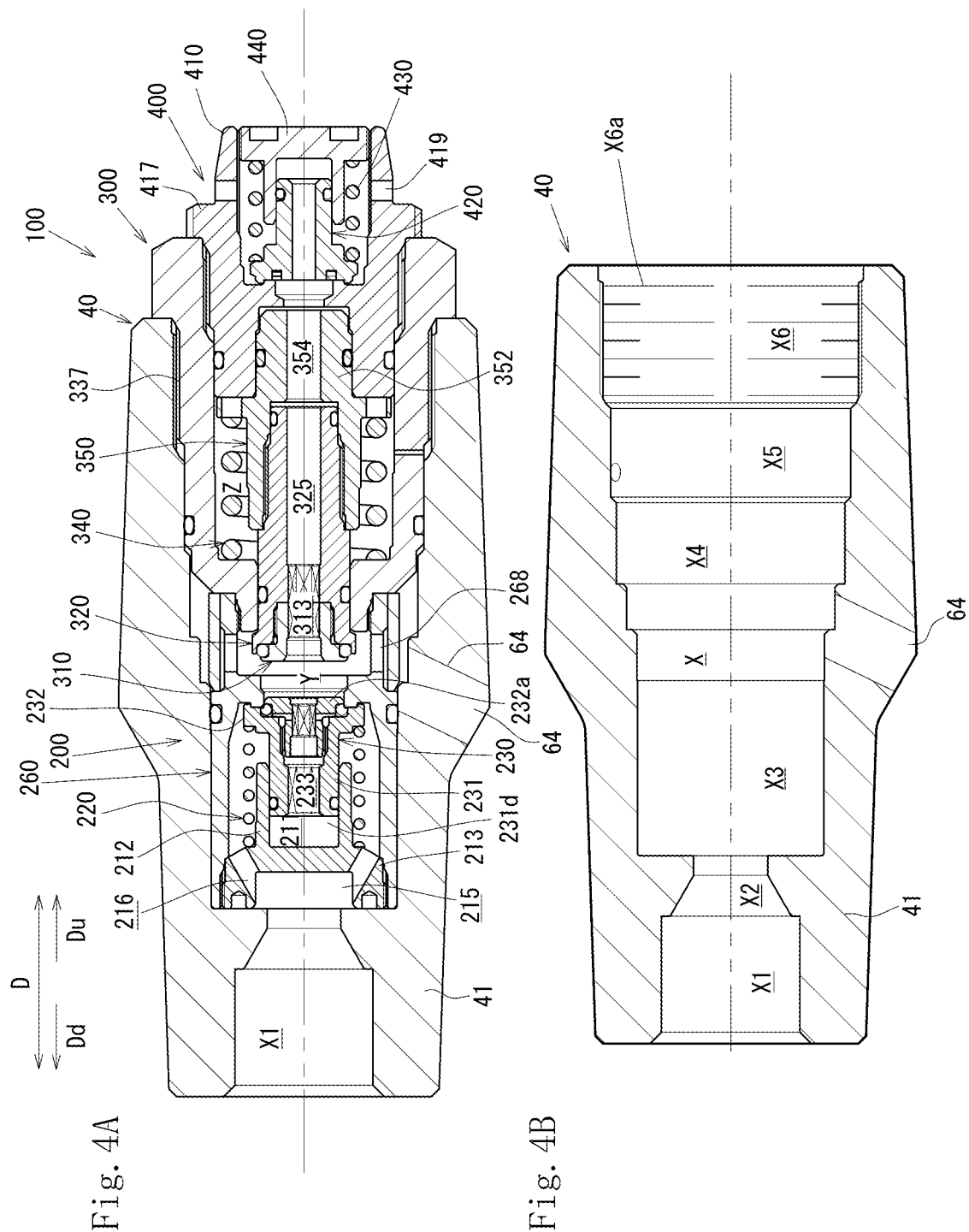
FIGS. 4A and 4B are diagrams describing a combination valve mechanism.
Figure 5:
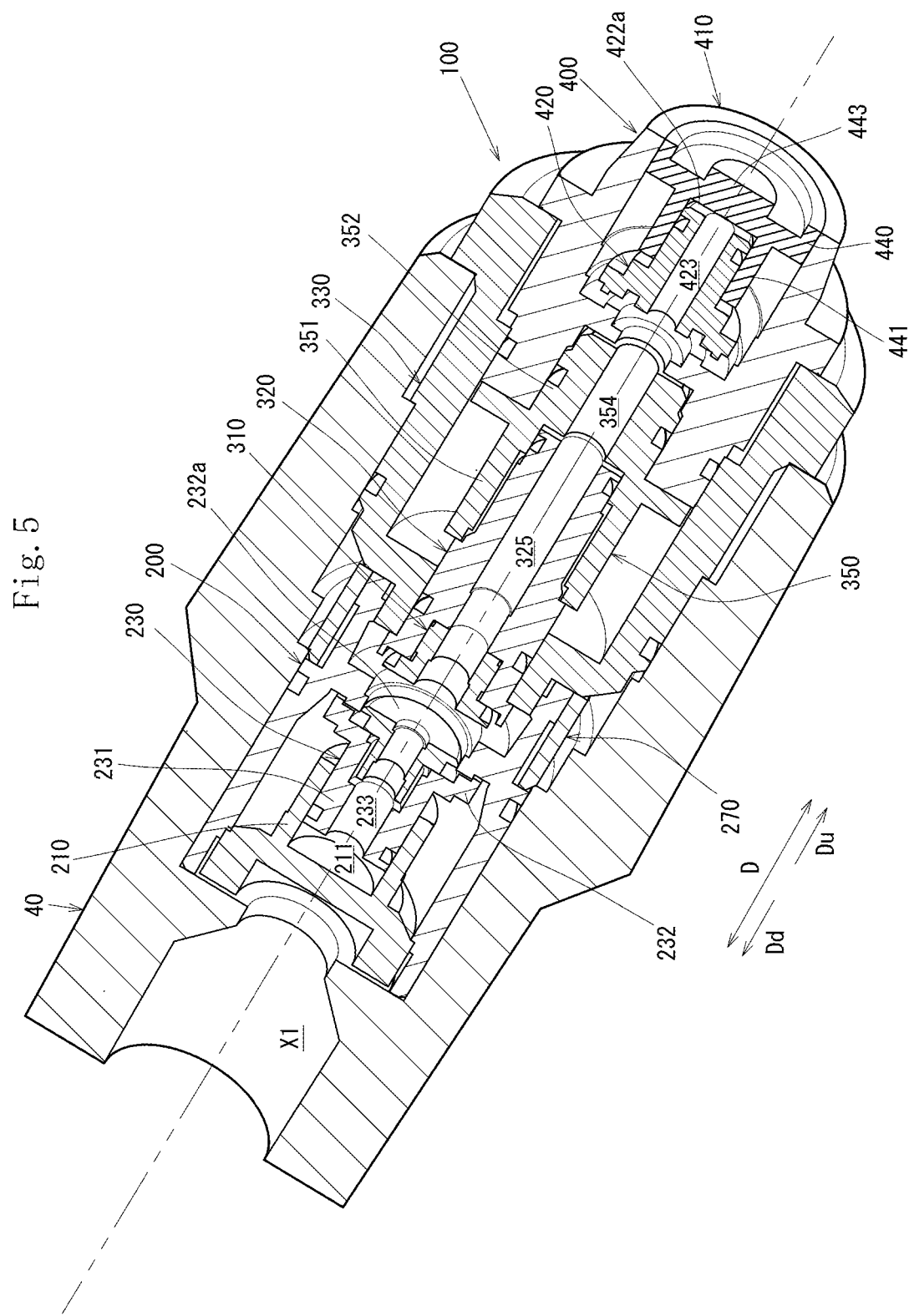
FIG. 5 is a cross-sectional perspective view of the combination valve mechanism.
Figures 6A, 6B:
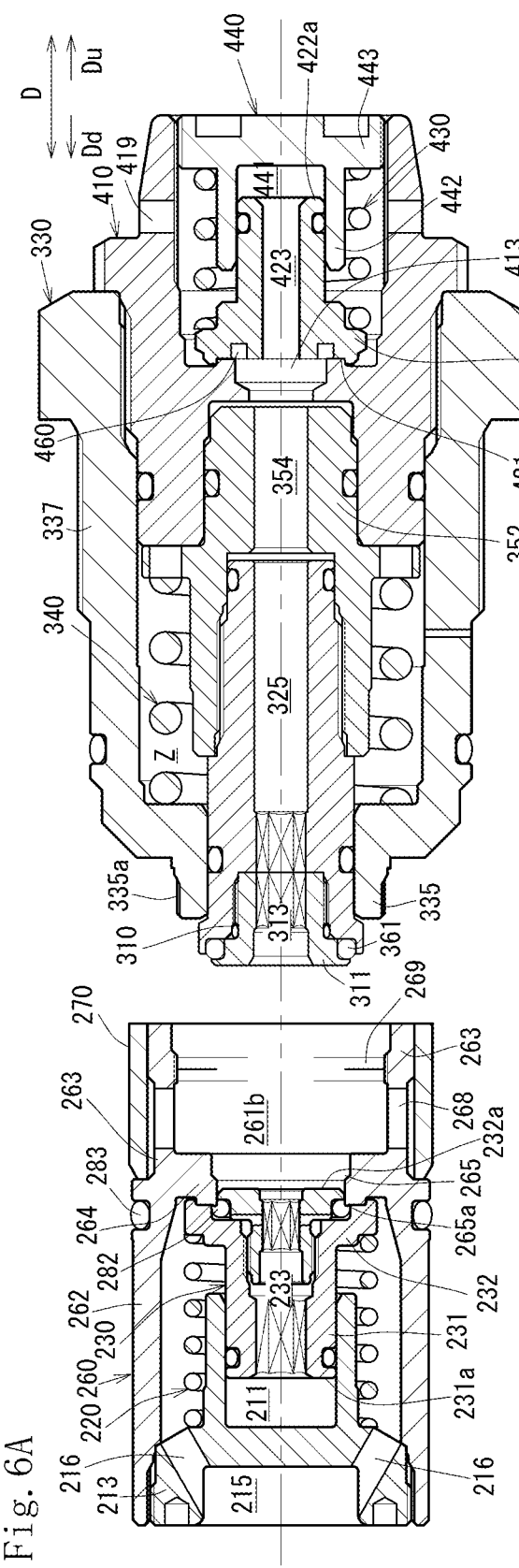
FIGS. 6A and 6B are cross-sectional views of the combination valve mechanism.
Figure 8:
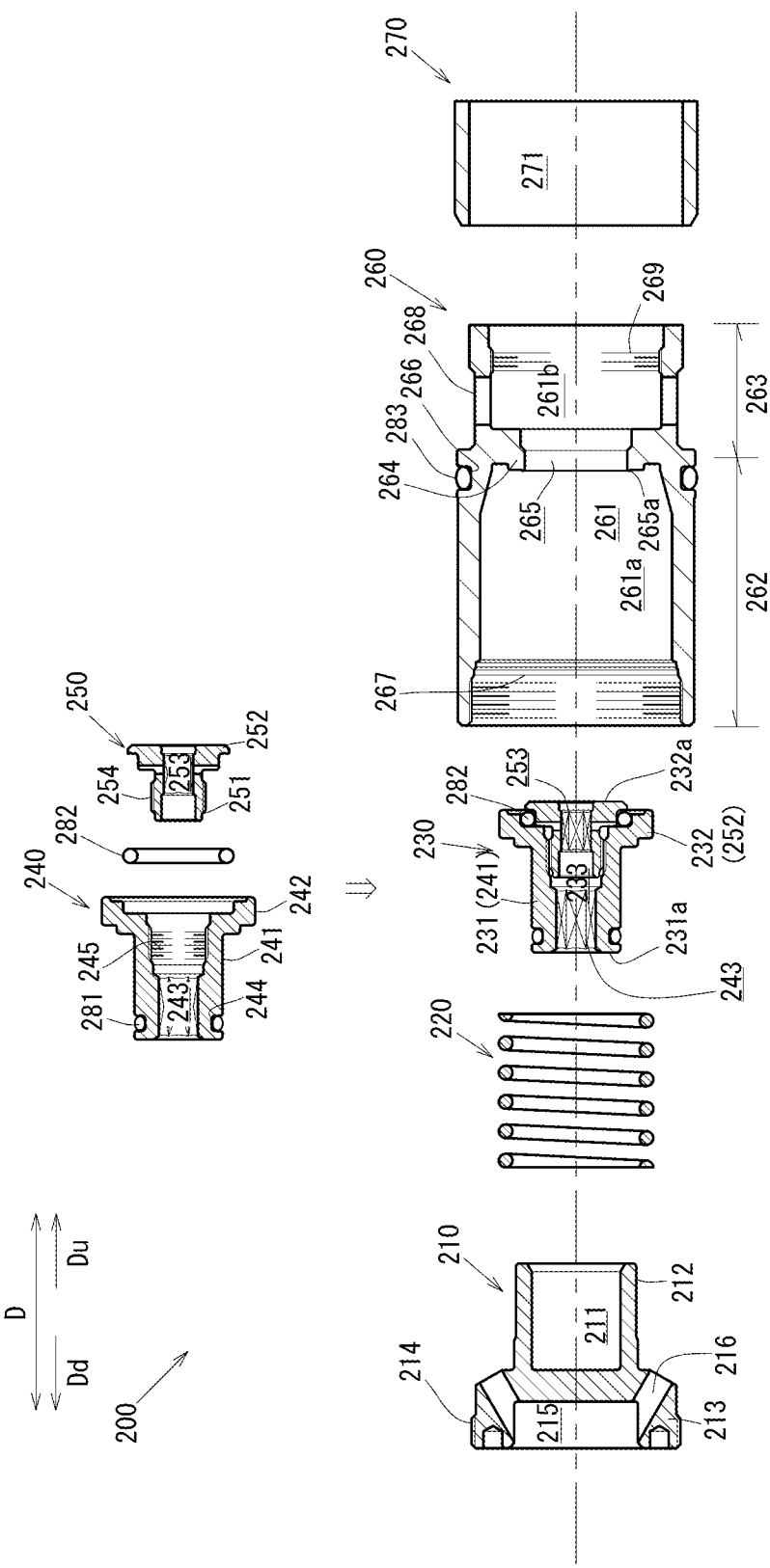
FIG. 8 is an exploded cross-sectional view of a non-return valve cassette.
Figure 10A:
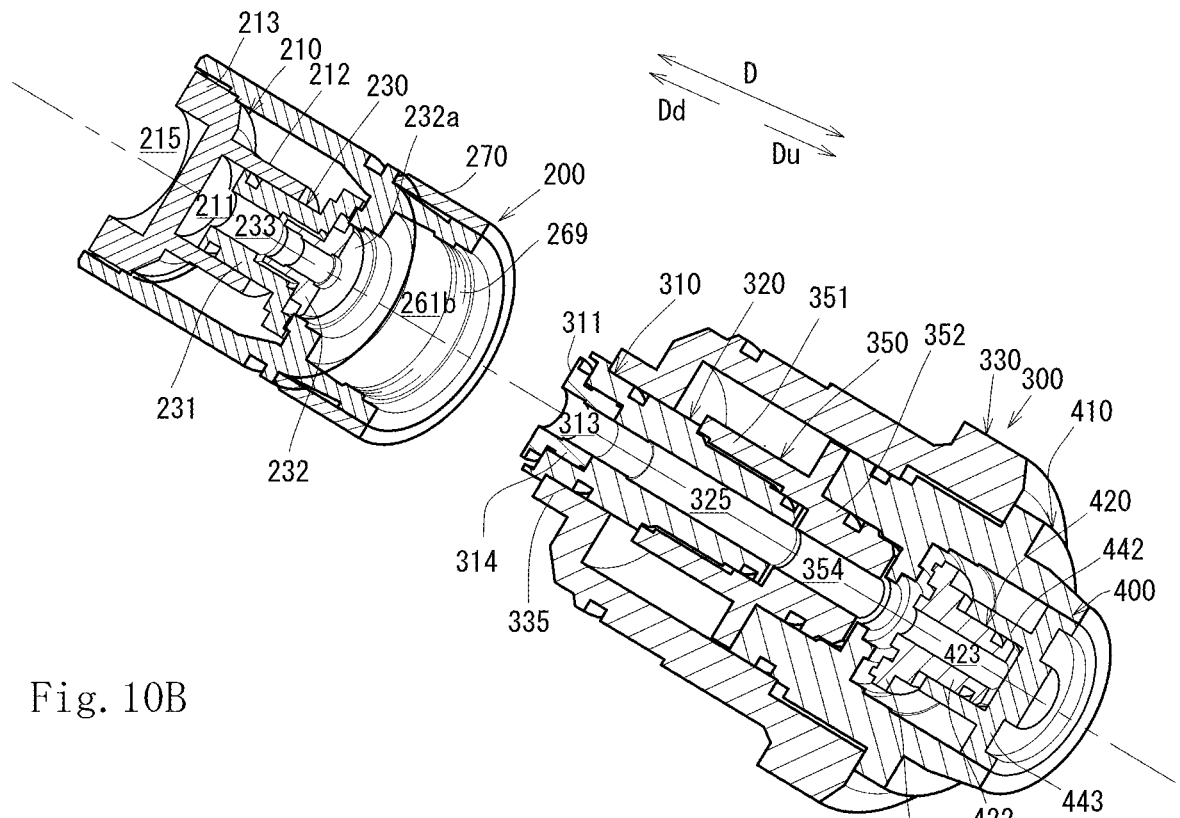
FIGS. 10A and 10B are cross-sectional perspective views of the combination valve mechanism.
Figure 10B:
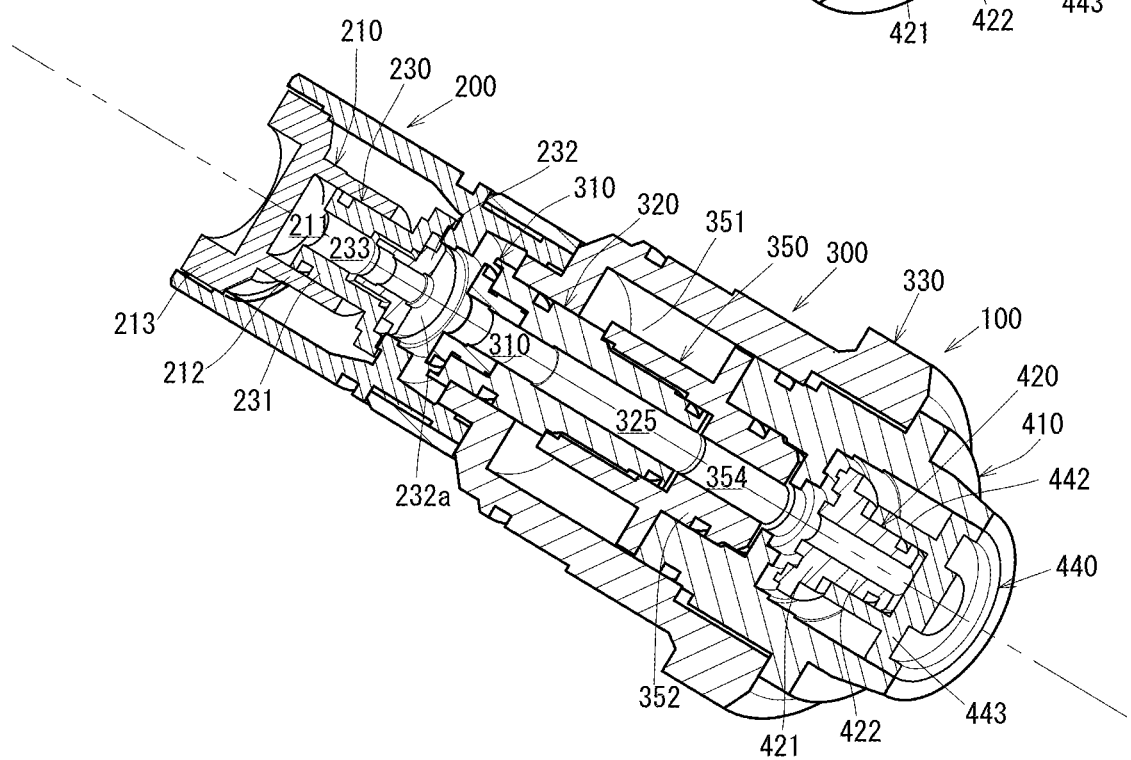
Figure 11:
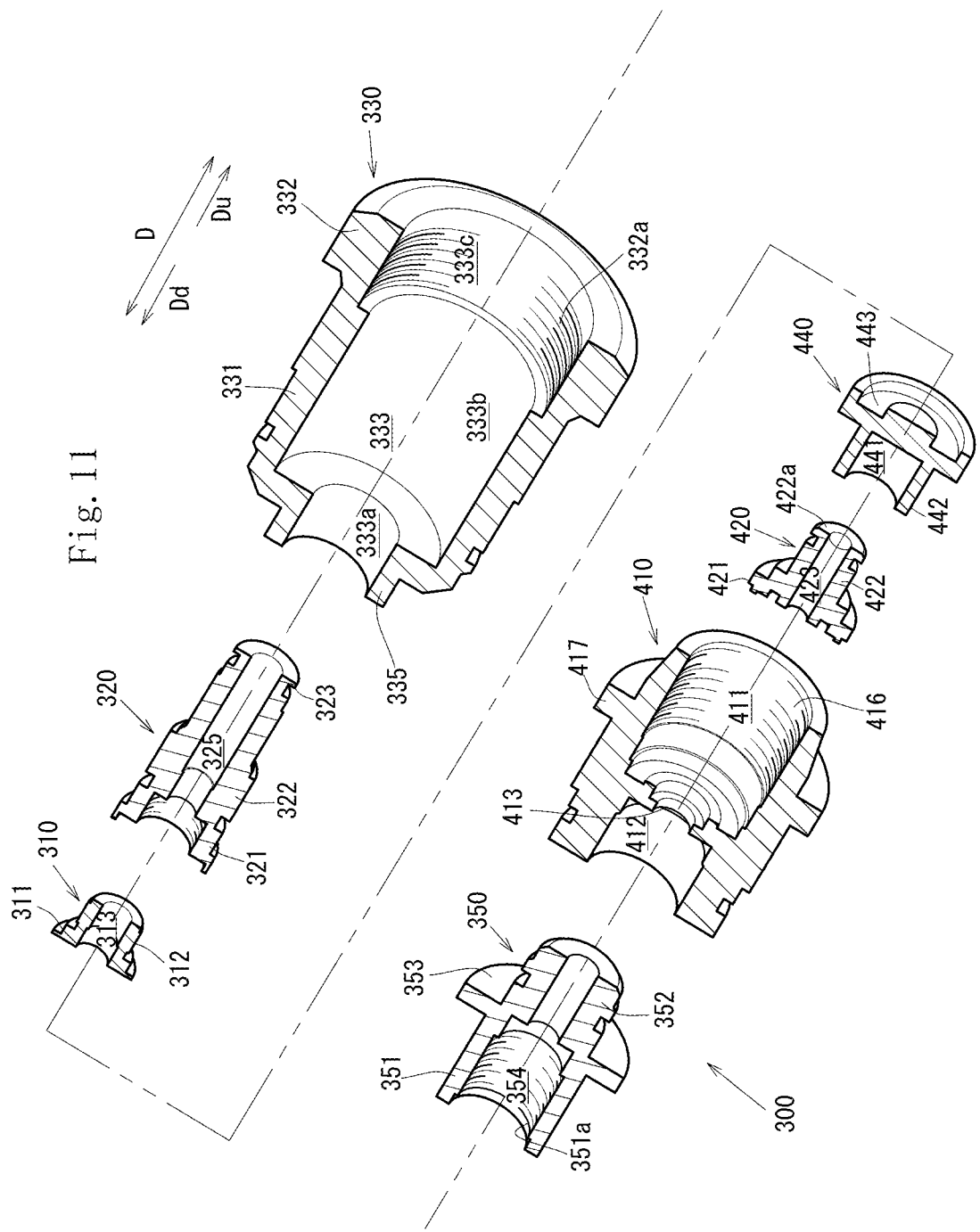
FIG. 11 is an exploded cross-sectional perspective view of the pressure reduction safety valve cassette.
Figure 13A:
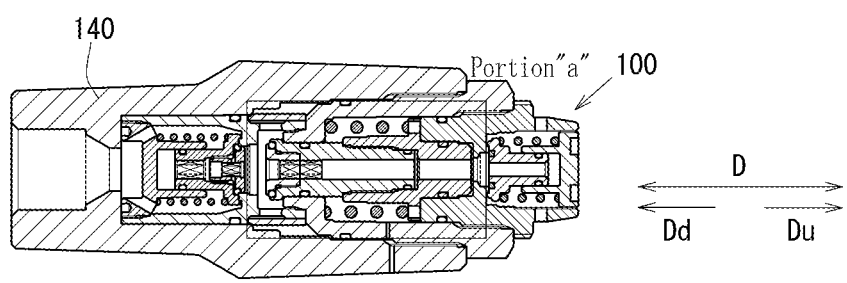
FIGS. 13A, 13B, and 13C are diagrams describing a pressure reduction valve mechanism in the pressure reduction safety valve cassette.
Figure 13B:
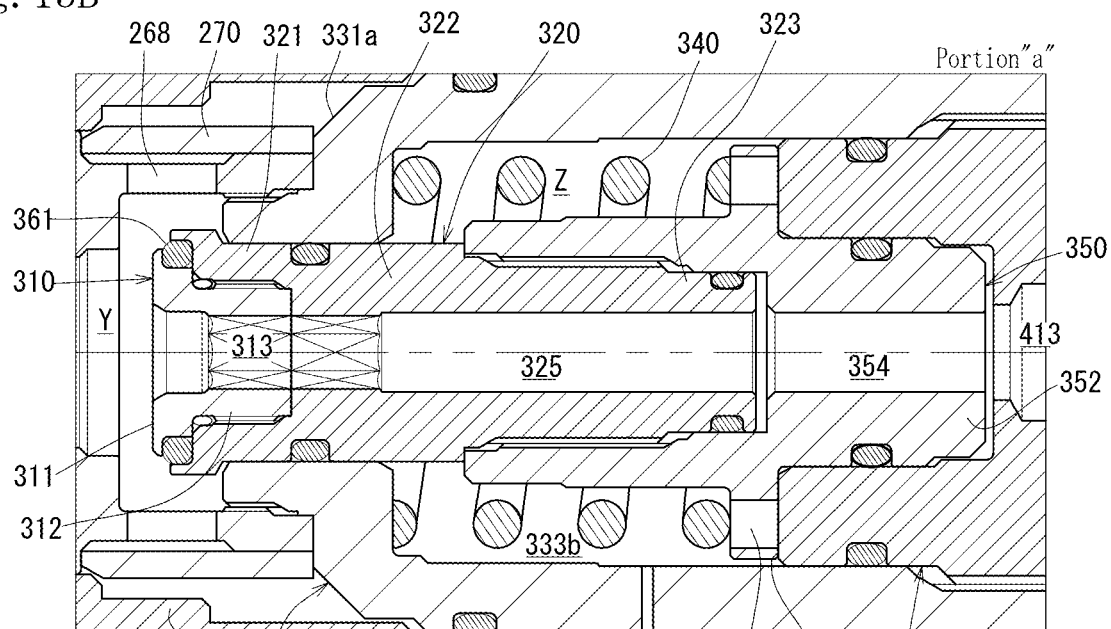
Figure 13C:
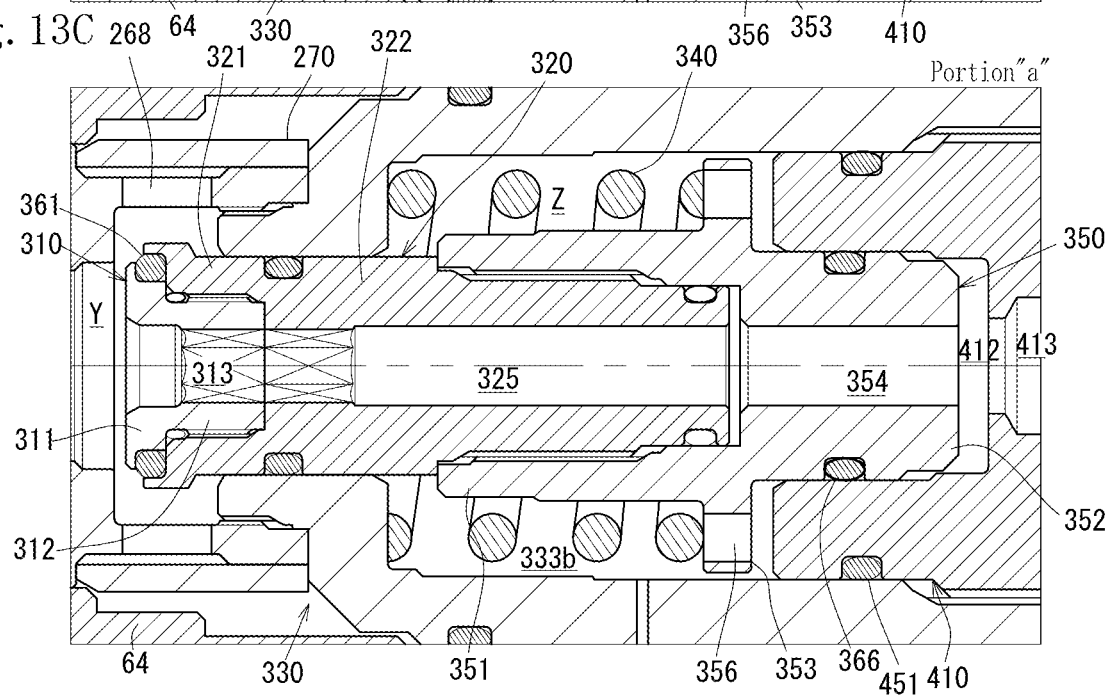
Figure 14A:
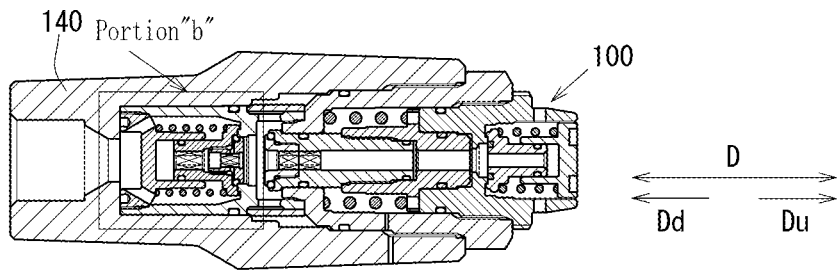
FIGS. 14A, 14B, and 14C are diagrams describing the non-return valve cassette.
Figure 14B:
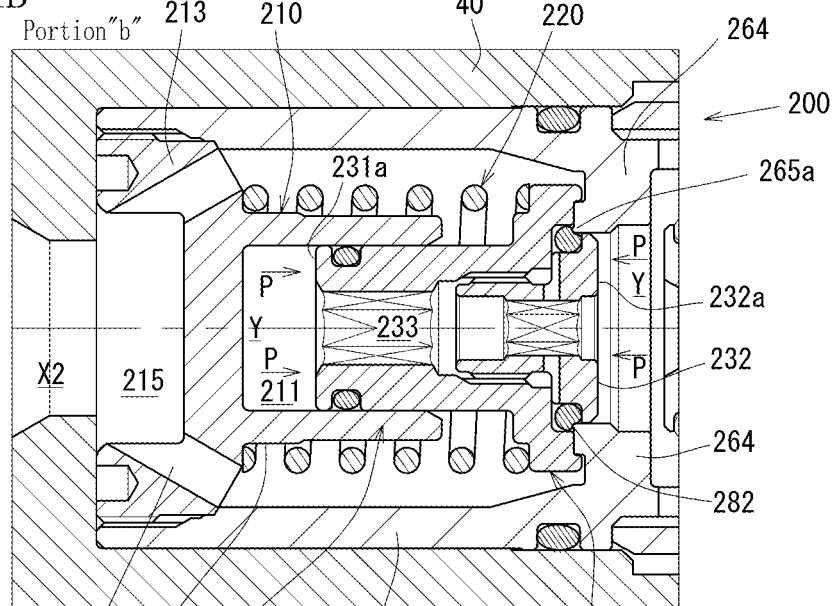
Figure 14C:
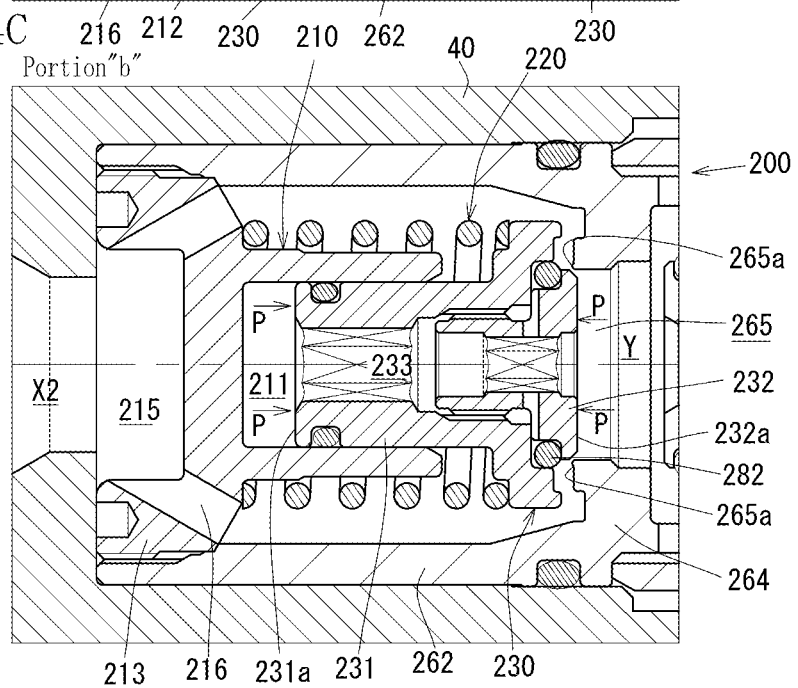

FIG. 1 is a front view of the consumption valve device 1. FIG. 2 is a cross-sectional view of the consumption valve device 1 taken along line b-b. FIG. 3 is a schematic diagram of a bundle V on which the consumption valve device 1 is mounted. FIGS. 4A and 4B are diagrams describing a combination valve mechanism 100. FIG. 5 is a cross-sectional perspective view of the combination valve mechanism 100. FIGS. 6A and 6B are cross-sectional views of the combination valve mechanism 100. FIG. 7 is an exploded cross-sectional view of a pressure reduction safety valve cassette 300 in the combination valve mechanism 100. FIG. 8 is an exploded cross-sectional view of a non-return valve cassette 200 in the combination valve mechanism 100. FIG. 9 is a cross-sectional perspective view of the combination valve mechanism 100 yet to be mounted. FIGS. 10A and 10B are cross-sectional perspective views of the combination valve mechanism 100. FIG. 11 is an exploded cross-sectional perspective view of the pressure reduction safety valve cassette 300. FIG. 12 is an exploded cross-sectional perspective view of the non-return valve cassette 200. FIGS. 13A to 13C are diagrams describing a pressure reduction valve mechanism in the pressure reduction safety valve cassette 300. FIGS. 14A to 14C are diagrams describing the non-return valve cassette 200. FIGS. 15A to 15C are diagrams describing a safety valve unit 400 in the pressure reduction safety valve cassette 300.

In detail, FIG. 4A is a cross-sectional view of the combination valve mechanism 100 taken along line a-a as viewed in the direction of the arrow in FIG. 1. FIG. 4B is a cross-sectional view of an outlet 40 as viewed in the same direction as in FIG. 4A.

FIG. 6A is an exploded cross-sectional view of the combination valve mechanism 100. FIG. 6B is a cross-sectional view of the combination valve mechanism 100.

FIG. 8 is an exploded cross-sectional view of the non-return valve cassette 200, additionally showing an exploded cross-section of a check valve 230.

FIG. 10A is a cross-sectional view of the non-return valve cassette 200 and the pressure reduction safety valve cassette 300 yet to be assembled. FIG. 10B is a cross-sectional view of the combination valve mechanism 100.

FIG. 13A is a cross-sectional view of the pressure reduction safety valve cassette 300. FIG. 13B is an enlarged cross-sectional view of the pressure reduction safety valve cassette 300 in a sealed state, showing a portion "a" in FIG. 13A. FIG. 13C is an enlarged cross-sectional view of the pressure reduction safety valve cassette 300 in a depressurized state, showing the portion "a" in FIG. 13A.

FIG. 14A is a cross-sectional view of the non-return valve cassette 200. FIG. 14B is an enlarged cross-sectional view of the non-return valve cassette 200 in a valve-closed state, showing a portion "b" in FIG. 14A. FIG. 14C is an enlarged cross-sectional view of the non-return valve cassette 200 in a valve-open state, showing the portion "b" in FIG. 14A.

FIG. 15A is a cross-sectional view of the safety valve unit 400. FIG. 15B is an enlarged cross-sectional view of the safety valve unit 400 in a sealed state, showing a portion "c" in FIG. 15A. FIG. 15C is an enlarged cross-sectional view of the safety valve unit 400 in a release state, showing the portion "c" in FIG. 15A.

In FIG. 2, the combination valve mechanism 100 mounted in an outlet secondary flow channel x is not shown. In FIGS. 5 and 9 to 12, a front portion is cut away to show the internal structure for easy understanding, and an O-ring and a coil spring are not shown. FIGS. 7 and 8 are cross-sectional views with O-rings fitted in place.

As shown in FIG. 3, the consumption valve device 1 for fluid consumption is mounted on the bundle V. In detail, the consumption valve device 1 is mounted adjacent to the gas consumption end of the bundle V, which is a bundle of cylinders B, and a valve device 1a is mounted adjacent to the gas supplying end. The consumption valve device 1 is connected to equipment that uses the gas.

The consumption valve device 1 mounted adjacent to the consumption end of the cylinders B includes a tall housing 31, a screw engagement portion 32 adjacent to the bottom of the housing 31 and screwed into a pipe p of the bundle V, the outlet 40 extending laterally near the middle of the housing 31, and a shut-off valve mechanism 50 mounted to the top of the housing 31.

Although not shown or described in detail as appropriate, O-rings are fitted at appropriate positions between the facing portions of the components of the shut-off valve mechanism 50 or between the facing portions of the shut-off valve mechanism 50 and the housing 31.

As shown in FIG. 2, the housing 31 includes a shut-off valve receiving recess 61 that allows the shut-off valve mechanism 50 to be fitted from above, a primary flow channel 62 communicating from the lower end of the shut-off valve receiving recess 61 to the lower end of the screw engagement portion 32, and a secondary flow channel 63 communicating from the lower end of the shut-off valve receiving recess 61 to the distal end of the outlet 40.

The shut-off valve receiving recess 61 is substantially cylindrical and open upward, with its bottom communicating with the upper end of the primary flow channel 62. The bottom has an upper end opening 62a formed through it and an opening valve seat 62b protruding upward along the rim of the upper end opening 62a.

The housing 31 has a flow channel 60 communicating from the lower end of the screw engagement portion 32 to the distal end of the outlet 40 via the shut-off valve receiving recess 61, the primary flow channel 62, and the secondary flow channel 63.

The outlet secondary flow channel x and a housing secondary flow channel 64, each of which is a part of the secondary flow channel 63 inside the outlet 40, will be described later in connection with the combination valve mechanism 100.

As shown in FIG. 2, the shut-off valve mechanism 50, which is received in the shut-off valve receiving recess 61, includes a rotatable handle 51, a gland nut 52, a spindle 53, an intermediate transmission unit 54, and a shut-off member 55 mounted on the bottom of the intermediate transmission unit 54.

The rotatable handle 51 is substantially circular and has an irregularly curved outline as viewed from above, or has a wavelike outline with eight protrusions. The rotatable handle 51 includes a receiving portion 51a, into which an upper fitting part 53a of the spindle 53 is to be fitted.

The gland nut 52 is hollow and substantially cylindrical. The gland nut 52 includes a head nut portion 52a, and a male thread 52b, which is screwed with a female thread on the inner surface of the shut-off valve receiving recess 61.

As shown in FIG. 2, the spindle 53 includes the upper fitting part 53a, which is fitted in the receiving portion 51a of the rotatable handle 51, and a lower fitting recess 53b, which is fitted in a spindle receiving recess 54a on the intermediate transmission unit 54.

As shown in FIG. 2, the intermediate transmission unit 54 is substantially columnar. The intermediate transmission unit 54 has the spindle receiving recess 54a in its upper end, into which the fitting recess 53b of the spindle 53 is to be fitted. The intermediate transmission unit 54 also has a shut-off member fitting recess 54b in its lower portion, into which the shut-off member 55 is to be fitted.

As shown in FIG. 2, the shut-off member 55 is an elastic member that is annular as viewed from above and fitted in the shut-off member fitting recess 54b in the intermediate transmission unit 54. In the valve-closed state, the opening valve seat 62b can wedge into the elastic member.

The shut-off valve mechanism 50 including the rotatable handle 51, the gland nut 52, the spindle 53, the intermediate transmission unit 54, and the shut-off member 55 is received in the shut-off valve receiving recess 61 by fitting the shut-off member 55 into the shut-off member fitting recess 54b in the intermediate transmission unit 54, fitting the fitting recess 53b in the spindle 53 into the spindle receiving recess 54a in the intermediate transmission unit 54, mounting the gland nut 52 on the spindle 53, and screwing the male thread 52b on the gland nut 52 with the female threads on the shut-off valve receiving recess 61. Then, the receiving portion 51a in the rotatable handle 51 is fitted with the fitting part 53a of the spindle 53 to compete the assembly of the shut-off valve mechanism 50.

When the rotatable handle 51 is screwed down by turning it in the tightening direction, the shut-off valve mechanism 50 assembled in this manner presses the intermediate transmission unit 54 downward via the spindle 53. In this state, the opening valve seat 62b around the upper end opening 62a wedges into the shut-off member 55 fitted in the shut-off member fitting recess 54b in the intermediate transmission unit 54, and the shut-off member 55 seals the upper end opening 62a. This state is referred to a sealed state.

Conversely, when the spindle 53 is unscrewed by turning the rotatable handle 51 in the loosening direction, the intermediate transmission unit 54 moves upward via the spindle 53 to unseal the upper end opening 62a. The primary flow channel 62, the shut-off valve receiving recess 61, and the secondary flow channel 63 communicate with one another, allowing the gas flow through the flow channel 60. This state is referred to as an open state.

The outlet 40, and the outlet secondary flow channel x, which is defined in the outlet 40 and is a part of the secondary flow channel 63 of the flow channel 60, will now be described with reference to FIGS. 2 and 4B.

The outlet 40 is substantially columnar and extends laterally. The outlet 40 includes a connector 41, which allows connection to equipment that uses the gas (not shown). The outlet 40 includes the internal outlet secondary flow channel x, which extends axially through the outlet 40.

Hereafter, the secondary flow channel 63 defined inside the housing 31 is referred to as a housing secondary flow channel 64, whereas the secondary flow channel 63 defined inside the outlet 40 is referred to as the outlet secondary flow channel x. The housing secondary flow channel 64 and the outlet secondary flow channel x form the T-shaped secondary flow channel 63 as viewed from above.

As shown in FIG. 4B, the outlet secondary flow channel x defines a substantially cylindrical space that extends axially through the outlet. The outlet secondary flow channel x includes a first space x1, a second space x2, a third space x3, a fourth space x4, a fifth space x5 with a large diameter, and a sixth space x6, which are formed in this order from the connector 41 (from left to right in FIGS. 4A and 4B) and open axially.

Hereafter, the arrow D in FIGS. 4A and 4B refers to a consumption direction D, where Du refers to an upstream side and Dd refers to a downstream side. The consumption direction D is the same as the axial direction described later.

The first space x1 receives the connector of a pipe connected to the equipment that uses the gas.

The second space x2 has a smaller diameter than the first space x1. The third space x3, which is a small-diameter space, has a larger diameter than the second space x2 and a slightly larger diameter than the open end of the first space x1. The fourth space x4 has a larger diameter than the first space x1, and has its diameter increasing in a stepwise manner. The fifth space x5 has a larger diameter than the largest-diameter portion of the fourth space x4. The sixth space x6 has a larger diameter than the fifth space x5 with its rear end open.

The fourth space x4 connects to the housing secondary flow channel 64 through an upstream space Y (described later). The sixth space x6 has a thread groove x6a on its inner surface, which is to be screwed with a thread 337 on the outer peripheral surface of a front body 331 of a pressure reduction valve case 330 when it is inserted into the sixth space x6.

The combination valve mechanism 100 is mounted in the third space x3 and extends through the sixth space x6 of the outlet secondary flow channel x, and functions as a residual pressure retaining mechanism, a pressure reduction mechanism, and a safety valve mechanism when the shut-off valve mechanism 50 is in an open state. The combination valve mechanism 100 will now be described with reference to FIGS. 4A to 15C.

The combination valve mechanism 100, which is mounted in the outlet secondary flow channel x, includes the non-return valve cassette 200 on the downstream side Dd and the pressure reduction safety valve cassette 300 on the upstream side Du. The non-return valve cassette 200 is inserted into the third space x3, and the pressure reduction safety valve cassette 300 is inserted into the fourth space x4 through the sixth space x6.

The pressure reduction safety valve cassette 300, which is inserted into the fourth space x4 through the sixth space x6, will now be described first with reference to FIGS. 7 and 11.

The pressure reduction safety valve cassette 300 includes a seal seat 310, a pressure reduction piston 320, the pressure reduction valve case 330, a second coil spring 340, a valve box 350, O-rings 360 (361 to 366), and the safety valve unit 400 in the stated order from the downstream side Dd to the upstream side Du.

The seal seat 310 receives the O-ring 361 on the downstream side Dd of the pressure reduction piston 320. The seal seat 310 is substantially cylindrical, and includes a flange 311 protruding radially outwardly on the downstream side Dd, a screw engagement cylinder 312 to be inserted into the pressure reduction piston 320 on its downstream side Dd, and an internal through-hole 313 extending axially (in the consumption direction D). The O-ring 362 is fitted in a receiving recess 314 formed between the flange 311 and the screw engagement cylinder 312. The seal seat 310 also has a thread 315 on its outer peripheral surface on the upstream side Du.

The pressure reduction piston 320 is substantially cylindrical, and includes a front body 321 into which the screw engagement cylinder 312 of the seal seat 310 is to be screwed, a rear body 323 screwed into a front body 351 of the valve box 350 described later, a middle body 322 between the front body 321 and the rear body 323, and an internal through-space 325 extending axially (in the consumption direction D). The pressure reduction piston 320 also receives the O-rings 363 and 364 fitted in O-ring grooves 324 formed on the outer peripheral surface of the middle body 322 and at the rear of the outer peripheral surface of the rear body 323.

The front body 321 has a thread groove 321a on its inner surface, which is to be screwed with the thread 315 on the seal seat 310. The rear body 323 has a thread 323a on its outer peripheral surface on the upstream side Du.

The seal seat 310 may also be integral with the pressure reduction piston 320.

The pressure reduction valve case 330 is substantially cylindrical, and includes the front body 331 to be inserted into the outlet secondary flow channel x, a rear body 332 protruding rearward from the outlet 40 in the assembled state, and an internal through-hole 333 extending in the consumption direction D.

The front body 331 has a downstream smaller-diameter portion 335 on its downstream side Dd, which is to be fitted onto the middle body 322 of the pressure reduction piston 320, and screwed into an upstream cylinder 263 of a check valve case 260 from the upstream side Du. The downstream smaller-diameter portion 335 has a thread 335a on its outer peripheral surface, which is to be screwed with a thread groove 269 on the upstream cylinder 263 in the check valve case 260 described later. The rear body 332 has a thread groove 332a on its inner surface, which is to be screwed with a thread 415 on a safety valve case 410. The O-ring 365 is fitted in an O-ring groove 336 on the outer peripheral surface of the front body 331 on the upstream side Du.

The front body 331 is screwed into the sixth space x6 in the outlet secondary flow channel x in the outlet 40. The front body 331 has the thread 337 on its periphery to be screwed with the thread groove x6a on the inner surface of the sixth space x6.

The through-hole 333 includes a small-diameter through-hole 333a defined in the downstream smaller-diameter portion 335, a middle through-hole 333b defined in the front body 331, and a large-diameter through-hole 333c defined in the rear body 332. A reaction force support 338 is arranged on the downstream side Dd in the middle through-hole 333b for providing a reaction force to the second coil spring 340 described below.

The second coil spring 340 is fitted onto the front body 351 of the valve box 350 described later. In the assembled state, the second coil spring 340 receives a reaction force from the reaction force support 338 of the pressure reduction valve case 330 to bias a flange 353 on the valve box 350 toward the upstream side Du.

The valve box 350 is substantially cylindrical, and includes the front body 351 to be fitted onto the rear body 323 of the pressure reduction piston 320 from the upstream side Du, an insertion rear body 352 to be inserted into a downstream recess 412 in the safety valve case 410 of the safety valve unit 400 described later, and the flange 353 protruding radially outwardly between the front body 351 and the insertion rear body 352. The valve box 350 has an internal through-space 354 extending in the consumption direction D.

The front body 351 that receives the rear body 323 of the pressure reduction piston 320 has a thread groove 351a on its inner surface, which is to be screwed with the thread 323a on the arranged rear body 323.

The O-ring 366 is fitted in an O-ring groove 355 formed at the rear of the outer peripheral surface of the insertion rear body 352.

The flange 353 has circumferential multiple through-holes 356 extending in the consumption direction D (axially).

The safety valve unit 400 includes the safety valve case 410, a relief valve 420, a third coil spring 430, a relief valve cylinder 440, O-rings 450 (451 and 452), and a seal packing 460.

The safety valve case 410 is substantially columnar, and is inserted into the rear body 332 of the pressure reduction valve case 330. The safety valve case 410 has the downstream recess 412 on the downstream side Dd for receiving the insertion rear body 352 of the valve box 350.

The safety valve case 410 also has a cylindrical relief space 411 on the upstream side Du of the downstream recess 412 for receiving the relief valve 420, the third coil spring 430, and the relief valve cylinder 440 described later. The relief space 411 communicates with the downstream recess 412 in the consumption direction D through a small-diameter communication space 413.

The O-ring 451 is fitted in an O-ring groove 414 on the outer peripheral surface of the safety valve case 410 on the downstream side Dd. The safety valve case 410 has the thread 415 on its outer surface, which is to be screwed with the thread groove 332a on the inner surface of the rear body 332. The relief space 411 in the safety valve case 410 has a thread groove 416 on its inner surface, which is to be screwed with a thread 444 on the relief valve cylinder 440 described later.

The safety valve case 410 has a flange 417 protruding radially outwardly on the upstream side Du of the thread 415. The safety valve case 410 also has two radial communication holes 419 on the upstream side Du of the flange 417 at circumferentially opposite positions. The radial communication holes 419 extend radially through the safety valve case 410 to communicate with the relief space 411.

The relief valve 420 includes a flange 421 protruding radially outwardly on the downstream side Dd, and an insertion cylinder 422 to be inserted into an accommodating space 441 in the relief valve cylinder 440 described later. The relief valve 420 also has an internal through-hole 423 extending axially (in the consumption direction D).

The seal packing 460 is fitted in a packing groove 424 on the downstream side Dd of the flange 421. The O-ring 452 is fitted in an O-ring groove 425 on the outer peripheral surface of the insertion cylinder 422 on the upstream side Du.

The end face of the flange 421 on the downstream side Dd is referred to as a safety valve upstream end 421a, and the end face of the insertion cylinder 422 on the upstream side Du is referred to as a safety valve downstream end 422a. The safety valve upstream end 421a and the safety valve downstream end 422a are annular as viewed in the consumption direction D. The safety valve upstream end 421a of the flange 421, which has a larger diameter than the insertion cylinder 422, has a larger projected area in the consumption direction D than the safety valve downstream end 422a of the insertion cylinder 422, which has a smaller diameter.

In the assembled state, the third coil spring 430 is fitted onto a cylinder body 442 between the flange 421 on the relief valve 420 and a flange 443 on the relief valve cylinder 440. The third coil spring 430 receives a reaction force from the flange 443 on the relief valve cylinder 440 to bias the relief valve 420 toward the downstream side Dd.

The relief valve cylinder 440 includes the cylinder body 442 with a bottom and the flange 443 on the upstream side Du of the cylinder body 442. The flange 443 protrudes radially outwardly. The cylinder body 442 is open on the downstream side Dd to define the accommodating space 441 for the insertion cylinder 422 of the relief valve 420. The flange 443 has the thread 444 on its radially outward periphery, which is to be screwed with the thread groove 416 in the relief space 411.

The safety valve unit 400 including these components is assembled together in the manner described below. The relief valve 420, the relief valve cylinder 440, and the third coil spring 430 are assembled with the third coil spring 430 fitted onto the cylinder body 442 between the flange 421 on the relief valve 420 and the flange 443 on the relief valve cylinder 440. The assembled relief valve 420, the relief valve cylinder 440, and the third coil spring 430 are then inserted into the relief space 411 in the safety valve case 410, and the thread 444 on the relief valve cylinder 440 is screwed with the thread groove 416 to assemble the safety valve unit 400 as a single unit. In this state, the third coil spring 430 receives a reaction force from the flange 443 on the relief valve cylinder 440 with the thread 444 screwed with the thread groove 416 on the safety valve case 410. The reaction force causes the third coil spring 430 to bias the relief valve 420 toward the downstream side Dd. The biased seal packing 460 fitted in the packing groove 424 covers the upstream side Du of the communication space 413 and seals the communication space 413.

The rear body 323 of the pressure reduction piston 320 with the seal seat 310 mounted on it to hold the O-ring 361 from the downstream side Dd is inserted into the small-diameter through-hole 333a in the pressure reduction valve case 330 from the downstream side Dd. The valve box 350 with the second coil spring 340 fitted onto the front body 351 is inserted into the middle through-hole 333b from the upstream side Du, and the rear body 323 of the pressure reduction piston 320 is inserted into the through-space 354. The thread 323a on the rear body 323 is screwed with the thread groove 351a to complete the assembly of the pressure reduction piston 320 and the valve box 350.

The safety valve case 410 with the relief valve 420, the third coil spring 430, and the relief valve cylinder 440 assembled together is also inserted into the through-hole 333 from the upstream side Du. In this state, the insertion rear body 352 of the valve box 350 is inserted into the downstream recess 412 in the safety valve case 410, and the thread 415 on the safety valve case 410 is screwed with the thread groove 332a into a single unit. This completes the assembly of the pressure reduction safety valve cassette 300.

In this state, the seal seat 310, the pressure reduction piston 320, and the valve box 350 assembled together are biased toward the upstream side Du relative to the pressure reduction valve case 330 under a reaction force from the reaction force support 338.

The non-return valve cassette 200 to be inserted into the third space x3 will now be described with reference to FIGS. 8 and 12.

The non-return valve cassette 200 includes a check valve cylinder 210, a first coil spring 220, the check valve 230, the check valve case 260, a ring filter 270, and O-rings 280 (281, 282, and 283).

The check valve cylinder 210 includes a cylinder body 212 with a bottom and a flange 213 on the cylinder body 212 on the downstream side Dd. The flange 213 protrudes radially outwardly. The cylinder body 212 is open on the upstream side Du to define an accommodating space 211 for an insertion cylinder 231 in the check valve 230.

The flange 213 has a thread 214 on its radially outward periphery, which is to be screwed with a thread groove 267 on the inner surface of a smaller-diameter through-hole 261 in the check valve case 260 described later. The flange 213 has an open space 215 on the downstream side Dd, which is open on the downstream side Dd. The flange 213 has a communication hole 216 that communicates the open space 215 outward through the upstream side Du of the flange 213.

In the assembled state, the first coil spring 220 is fitted onto the cylinder body 212 between a flange 232 on the check valve 230 and the flange 213 on the check valve cylinder 210. The first coil spring 220 receives a reaction force from the flange 213 of the check valve cylinder 210 to bias the check valve 230 toward the upstream side Du.

The check valve 230 includes a seal seat 250 on the upstream side Du and a check valve body 240 on the downstream side Dd assembled together with the O-ring 282 held between them in the consumption direction D.

The check valve body 240 includes an insertion cylinder 241 to be inserted into the accommodating space 211 in the check valve cylinder 210, and a flange 242 on the upstream side Du. The flange 242 protrudes radially outwardly. The check valve body 240 also has an internal through-hole 243 extending axially (in the consumption direction D). The check valve body 240 has a thread groove 245 on the upstream side Du of the through-hole 243. The thread groove 245 is to be screwed with a thread 254 formed on the outer peripheral surface of an insertion cylinder 251 of the seal seat 250 described later.

The O-ring 281 is fitted in an O-ring groove 244 on the outer peripheral surface of the insertion cylinder 241 on the downstream side Dd.

The seal seat 250 receives the O-ring 282 on the upstream side Du of the check valve body 240, and includes the insertion cylinder 251 to be inserted from the upstream side Du of the through-hole 243 in the check valve body 240 and a flange 252 protruding radially outwardly on the upstream side Du. The seal seat 250 also has an internal through-hole 253 extending axially (in the consumption direction D). The insertion cylinder 251 has the thread 254 on its outer peripheral surface, which is to be screwed with the thread groove 245 on the upstream side Du of the through-hole 243.

The check valve body 240 and the seal seat 250 with these structures are assembled into the check valve 230 in the manner described below. The insertion cylinder 251 of the seal seat 250 is inserted into the through-hole 243 in the check valve body 240 from the upstream side Du with the O-ring 282 held between the flange 242 and the flange 252. The thread 254 is screwed with the thread groove 245. This completes the assembly of the check valve 230.

In the assembled check valve 230, the insertion cylinder 241 in the check valve body 240 serves as the insertion cylinder 231 in the check valve 230, and the flange 252 on the seal seat 250 serves as the flange 232 of the check valve 230. The through-hole 243 in the check valve body 240 communicates with the through-hole 253 in the seal seat 250, and the through-hole 243 and the through-hole 253 form a communication hole 233 in the check valve 230.

The end face of the insertion cylinder 241 on the downstream side Dd, which serves as the insertion cylinder 231 in the check valve 230, is referred to as a downstream end 231a. The end face of the flange 252 on the upstream side Du, which serves as the flange 232 on the check valve 230, is referred to as an upstream end 232a. The downstream end 231a and the upstream end 232a are annular as viewed in the consumption direction D. Although the flange 252 and the insertion cylinder 241 have substantially the same diameter, the through-hole 243 has a larger diameter than the through-hole 253, and thus the downstream end 231a has a smaller projected area in the consumption direction D than the upstream end 232a.

The check valve body 240 may also be integral with the seal seat 250.

The check valve case 260 is substantially cylindrical and has the smaller-diameter through-hole 261 extending in the consumption direction D. The check valve case 260 includes a downstream cylinder 262 on the downstream side Dd and the upstream cylinder 263 on the upstream side Du. The check valve case 260 has a partition 264 between the downstream cylinder 262 and the upstream cylinder 263 for dividing the smaller-diameter through-hole 261 into the upstream side Du and the downstream side Dd.

The partition 264 has a smaller-diameter hole 265 communicating a downstream smaller-diameter through-hole 261a defined in the downstream cylinder 262 and an upstream smaller-diameter through-hole 261b defined in the upstream cylinder 263. Both the through-holes 261a and 261b are included in the smaller-diameter through-hole 261.

The partition 264 includes an edge protrusion 265a protruding toward the downstream side Dd along the rim of the smaller-diameter hole 265.

The O-ring 283 is fitted in an O-ring groove 266 on the outer peripheral surface of the downstream cylinder 262 on the upstream side Du. The downstream cylinder 262 has the thread groove 267 on its inner surface on the downstream side Dd, which is to be screwed with the thread 214 on the check valve cylinder 210.

The upstream cylinder 263 has two radial communication holes 268 on the downstream side Dd at circumferentially opposite positions to allow the upstream smaller-diameter through-hole 261b to communicate radially outward. The upstream cylinder 263 has the thread groove 269 near the center in the consumption direction D, which is to be screwed with the thread 335a on the outer peripheral surface of the downstream smaller-diameter portion 335.

The ring filter 270 is fitted onto the upstream cylinder 263 in the check valve case 260 and arranged along the inner peripheral surface of the fourth space x4 in the outlet secondary flow channel x on the downstream side Dd. The ring filter 270 is radially thin and cylindrical with an internal space 271 extending through the ring filter 270 in the consumption direction D to prevent dust from entering the outlet secondary flow channel x.

In the non-return valve cassette 200 including these components, the insertion cylinder 231 in the check valve 230 is inserted into the accommodating space 211 in the check valve cylinder 210 from the upstream side Du. In this state, the first coil spring 220 is fitted into the accommodating space 211 between the flange 213 on the check valve cylinder 210 and the flange 232 on the check valve 230.

In this manner, the check valve cylinder 210 can be mounted in the check valve case 260. With the first coil spring 220 held between the flange 213 and the flange 232, the check valve cylinder 210 and the check valve 230 having the insertion cylinder 231 inserted in the accommodating space 211 are inserted into the downstream smaller-diameter through-hole 261a in the check valve case 260 from the downstream side Dd. The thread 214 on the check valve cylinder 210 is screwed with the thread groove 267 on the check valve case 260. The ring filter 270 is fitted onto the upstream cylinder 263 in the check valve case 260 to complete the assembly of the non-return valve cassette 200.

In this state, the first coil spring 220 receives a reaction force from the flange 213 on the check valve cylinder 210 with the thread 214 screwed with the thread groove 267 on the check valve case 260. The reaction force causes the first coil spring 220 to bias the check valve 230 toward the upstream side Du. As shown in FIG. 14B, the O-ring 282 fitted on the check valve 230 is thus pressed against the edge protrusion 265a of the partition 264 to seal the smaller-diameter hole 265. The space on the upstream side Du of the smaller-diameter hole 265 in this sealed state is the upstream space Y.

In the above sealed state, the accommodating space 211 in the check valve cylinder 210 communicates with the space on the upstream side Du of the smaller-diameter hole 265 through the communication hole 233 in the check valve 230, thus defining a part of the upstream space Y. In this sealed state, the upstream end 232a of the check valve 230 is exposed to the upstream space Y in the space on the upstream side Du of the smaller-diameter hole 265, and the downstream end 231a of the insertion cylinder 231 in the check valve 230 in the accommodating space 211 is also exposed to the upstream space Y in the accommodating space 211.

The non-return valve cassette 200 and the pressure reduction safety valve cassette 300 assembled as described above are incorporated into the combination valve mechanism 100 in the manner described below. As shown in FIGS. 6A and 10A, the downstream smaller-diameter portion 335 of the pressure reduction safety valve cassette 300 is inserted into the upstream smaller-diameter through-hole 261b in the non-return valve cassette 200. The thread 335a on the periphery of the downstream smaller-diameter portion 335 of the pressure reduction valve case 330 is screwed with the thread groove 269 on the inner surface of the upstream cylinder 263 in the check valve case 260 (refer to FIGS. 6B and 10B) to complete the combination valve mechanism 100.

The combination valve mechanism 100 assembled in this manner can be mounted in the outlet 40. The combination valve mechanism 100 is inserted into the outlet secondary flow channel x in the outlet 40 from the upstream side Du, and the thread 337 on the pressure reduction safety valve cassette 300 is screwed with the thread groove x6a on the inner surface of the sixth space x6. In this mounted state, the non-return valve cassette 200 is located in the third space x3, and the pressure reduction safety valve cassette 300 is located in the fourth space x4 through the sixth space x6.

As shown in FIGS. 4A and 14B and described above, the combination valve mechanism 100 mounted in the outlet secondary flow channel x is in the valve-closed state (initial state). This is because the O-ring 282 in the non-return valve cassette 200 biased toward the upstream side Du by the first coil spring 220 is pressed against the edge protrusion 265a on the partition 264 of the check valve case 260 inserted in the third space x3, and the insertion rear body 352 of the valve box 350 biased toward the upstream side Du by the second coil spring 340 is inserted in the downstream recess 412 of the safety valve case 410 (also, refer to FIG. 13B).

In this state, the middle through-hole 333b has an outer space Z separated from the through-spaces 325 and 354 and defined radially outside the pressure reduction piston 320 and the valve box 350 on which the second coil spring 340 is fitted (refer to FIG. 13B).

When the spindle 53 is unscrewed by turning the rotatable handle 51 in the loosening direction from the initial state (valve-closed position) shown in FIG. 4A into the open state, the gas in the cylinders B of the bundle V is discharged to flow through the primary flow channel 62, the shut-off valve receiving recess 61, and the secondary flow channel 63 and enter the upstream space Y through the housing secondary flow channel 64. The gas entering the upstream space Y flows into the pressure reduction safety valve cassette 300 through the radial communication hole 268 in the check valve case 260.

The gas entering the pressure reduction safety valve cassette 300 flows through the through-hole 313 in the seal seat 310 at the valve-open position, the through-space 325 in the pressure reduction piston 320, and the through-space 354 in the valve box 350 to the downstream recess 412 and the communication space 413.

When the pressure difference between the pressure of the gas reaching the downstream recess 412 and the communication space 413, or the gas pressure in the upstream space Y, and the pressure in the outer space Z is greater than the spring force of the second coil spring 340 biasing toward the upstream side Du, the seal seat 310, the pressure reduction piston 320, and the valve box 350 move toward the downstream side Dd to the valve-open position against the spring force of the second coil spring 340.

In this manner, the seal seat 310, the pressure reduction piston 320, and the valve box 350 move to the downstream side Dd and the upstream side Du repeatedly at high speed in accordance with the gas pressure, causing the gas to flow from the upstream space Y to the fourth space x4. The area difference reduces the pressure of the gas to a predetermined pressure, and thus the pressure reduction safety valve cassette 300 functions as a pressure reduction valve mechanism.

Further, the reduced pressure of the gas flowing into the fourth space x4 causes the check valve 230 at the valve-closed position with the O-ring 282 pressed against the edge protrusion 265a to move toward the downstream side Dd against the spring force of the first coil spring 220 to the valve-open position, thus causing the gas to flow from the second space x2 and the first space x1 for consumption (consumption state, refer to FIG. 14C).

As the gas in the bundle V continues to be consumed in the consumption state, the gas in the bundle V decreases, and the gas pressure decreases.

The decreasing gas pressure in the bundle V will be directly applied to the non-return valve cassette 200 without being reduced by the pressure reduction safety valve cassette 300, or with the pressure reduction safety valve cassette 300 still at the valve-closed position. When the pressure (upstream pressure P) of the gas (upstream gas) in the upstream space Y applied to the non-return valve cassette 200 decreases to a retaining residual pressure, or a retaining pressure, the check valve 230 in the open state shown in FIG. 14C moves toward the upstream side Du under the spring force of the first coil spring 220, and the O-ring 282 is pressed against the edge protrusion 265a. This causes the valve to enter the sealed state, or more specifically, return to the initial state shown in FIG. 14B. The non-return valve cassette 200 thus functions as a residual pressure holder that allows the retaining pressure gas to remain in the bundle V.

In this state, the upstream pressure (retaining pressure) P is applied toward the upstream side Du to the downstream end 231a of the check valve 230 in the accommodating space 211 in the check valve cylinder 210, which defines a part of the upstream space Y, through the communication hole 233 in the check valve 230 as shown in FIG. 14B.

Thus, the upstream pressure P applied toward the downstream side Dd to the check valve 230 is a pressure (area differential pressure) determined by the difference between the area of the upstream end 232a, which is the end face of the check valve 230 on the upstream side Du, and the area of the downstream end 231a, which is the end face of the check valve 230 on the downstream side Dd. The first coil spring 220 for moving the check valve 230 toward the upstream side Du may simply have a spring force against the area differential pressure. The first coil spring 220 can thus be smaller than in the structure that applies a force against the pressure applied in accordance with the area of the upstream end 232a.

The pressure of the bundle V decreases in the consumption state, and the upstream pressure applied to the non-return valve cassette 200 decreases to return to the initial state. When the upstream pressure approaches the retaining pressure during this period, the spring force of the first coil spring 220 causes the check valve 230 to move toward the upstream side Du and the O-ring 282 toward the edge protrusion 265*a*, and thus the gas flow may decrease. However, the communication hole 216 in the check valve cylinder 210 allows a sufficiently high rate of gas flow through it and enter the second space x2 and the first space x1.

In the above consumption state, the gas entering the pressure reduction safety valve cassette 300 may have an excessive pressure (hereafter, overpressure Po). In this case, as shown in FIG. 15B, the relief valve 420 biased toward the downstream side Dd by the third coil spring 430 and sealing the communication space 413 moves toward the upstream side Du against the spring force of the third coil spring 430 (refer to FIG. 15C), releasing the gas through the radial communication hole 419 in the safety valve case 410 after flowing through the through-hole 423.

As shown in FIG. 15B, the overpressure Po is also applied through the through-hole 423 in the relief valve 420 in the sealed state to the accommodating space 441 in the relief valve cylinder 440. The overpressure Po is thus applied toward the downstream side Dd to the end face of the insertion cylinder 422 of the relief valve 420 on the upstream side Du.

Thus, the overpressure Po applied toward the upstream side Du to the relief valve 420 is determined by the difference between the area of the safety valve upstream end 421*a* of the flange 421 on the relief valve 420 and the area of the safety valve downstream end 422*a* of the relief valve 420 on the upstream side Du. The third coil spring 430 for moving the relief valve 420 toward the downstream side Dd may simply have a spring force against the overpressure Po. The safety valve unit 400 can thus be larger using the same coil spring with a spring against the pressure applied in accordance with the area of the safety valve upstream end 421*a* of the flange 421 on the relief valve 420.

In the above consumption state, when the spindle 53 is screwed down by turning the rotatable handle 51 in the tightening direction to cause the valve to enter the sealed state, the gas stops flowing into the housing secondary flow channel 64 and the outlet secondary flow channel x through the upstream space Y. The valve thus returns to the initial state shown in FIG. 4A in the reversed process. More specifically, the combination valve mechanism 100 is at the valve-open position, and the valve box 350 is at the valve-closed position.

As described above, the combination valve mechanism 100 is mountable on the consumption valve device 1 to regulate flow of a fluid. The consumption valve device 1 includes the flow channel 60 in which the gas flows and the intermediate transmission unit 54 located in the shut-off valve receiving recess 61 of the flow channel 60 and switchable between the open state and the closed state. The consumption valve device 1 includes the non-return valve cassette 200 and the combination valve mechanism 100 including the non-return valve cassette 200. The non-return valve cassette 200 is mountable in the outlet secondary flow channel x on the downstream side Dd of the intermediate transmission unit 54 in the flow channel 60 of the non-return valve cassette 200. The non-return valve cassette 200 includes the check valve 230 movable forward and backward between the valve-closed position and the valve-open position in the outlet secondary flow channel x, and movable backward to the valve-open position under the upstream pressure P of the gas flowing in the upstream space Y. The non-return valve cassette 200 also includes the first coil spring 220 with a spring force to bias the check valve 230 toward the upstream side Du from the valve-open position toward the valve-closed position, and to permit the check valve 230 to move toward the downstream side Dd from the valve-closed position to the valve-open position against the biasing toward the upstream side Du when the gas flowing upstream has a predetermined pressure or greater. The check valve 230 includes, in the area of the check valve 230 at the valve-closed position communicating with the upstream space Y, or as a part of the check valve 230 exposed to the upstream space Y in the sealed state, the downstream end 231*a* for receiving a pressure at the upstream side and having a smaller projected area in the consumption direction D than the upstream end 232*a* for receiving a pressure at the downstream side. This structure increases the retaining residual pressure without upsizing.

More specifically, the consumption valve device 1 includes the check valve 230 movable forward and backward between the valve-closed position and the valve-open position in the outlet secondary flow channel x, and movable backward to the valve-open position under the upstream pressure P of the gas flowing in the upstream space Y. The consumption valve device 1 also includes the first coil spring 220 with the spring force to bias the check valve 230 toward the upstream side Du from the valve-open position to the valve-closed position, and to permit the check valve 230 to move toward the downstream side Dd from the valve-closed position to the valve-open position against the biasing toward the upstream side Du when the gas flowing upstream has the predetermined pressure or greater. The spring force of the first coil spring 220 applied toward the upstream side Du reliably closes the valve at the valve-closed position. Conversely, when the check valve 230 receives the predetermined upstream pressure P or greater of the gas flowing in the upstream space Y, the check valve 230 moves toward the valve-open position against the spring force of the first coil spring 220 to cause the gas to flow.

When the upstream pressure decreases to the predetermined pressure, the spring force of the first coil spring 220 moves the check valve 230 to the valve-closed position, allowing the gas with the predetermined pressure to remain within the cylinders in the bundle.

In this state, the upstream end 232*a* of the check valve 230 receives the pressure at the downstream side, and the first coil spring 220 is to move the check valve 230 to the valve-closed position against the pressure at the downstream side. However, the downstream end 231*a* having a smaller area than the upstream end 232*a* receives the pressure at the upstream side.

In this manner, the check valve 230 receives the pressures in opposite directions, or the pressure at the downstream side applied toward the upstream end 232*a* and the pressure at the upstream side applied toward the downstream end 231*a*, which cancel each other. The check valve 230 thus receives the differential pressure between the pressure at the downstream side applied toward the upstream end 232*a* and the pressure at the upstream side applied toward the downstream end 231*a*. With the downstream end 231*a* having a smaller projected area than the upstream end 232*a*, the check valve 230 receives the pressure obtained by subtracting the pressure at the upstream side from the pressure at the downstream side, or specifically the differential pressure applied toward the downstream side.

Thus, the first coil spring 220 with a spring force against the differential pressure applied toward the downstream side Dd can move the check valve 230 to the valve-closed position. The first coil spring 220 may simply have a spring force against the differential pressure applied toward the downstream side Dd. The first coil spring 220 may have a smaller spring force than a coil spring for simply receiving the pressure at the downstream side, for example, a coil spring that biases a check valve with no communication holes. The first coil spring 220 may thus be smaller. This structure increases the retaining residual pressure without upsizing.

The consumption valve device 1 further includes the check valve cylinder 210 that supports the check valve 230 in a movable manner. The first coil spring 220 biases the check valve 230 toward the upstream side Du under a reaction force from the check valve cylinder 210. The check valve 230 includes the flange 232 that seals the smaller-diameter hole 265 of the check valve 230 at the valve-closed position, and the insertion cylinder 231 located on the downstream side Dd of the flange 232. The check valve 230 also has the communication hole 233 extending in the consumption direction D through the flange 232 and the insertion cylinder 231. The check valve cylinder 210 includes the cylindrical accommodating space 211 accommodating the insertion cylinder 231 in a manner to move the cylinder forward and backward. The accommodating space 211 in the check valve cylinder 210 accommodates the insertion cylinder 231 of the check valve 230 in a manner to move the cylinder forward and backward, and the first coil spring 220 biases the check valve 230 toward the upstream side Du under the reaction force from the check valve cylinder 210. This structure enables the check valve 230 to move forward and backward accurately in the consumption direction D.

The upstream end 232a includes an upstream side Du of the check valve 230. This structure can be smaller than the structure including, on the flange 232, an additional surface facing the upstream side Du.

The check valve cylinder 210 has the communication hole 216 communicating between the upstream side Du and the downstream side Dd of the check valve cylinder 210. The communication hole 216 achieves a sufficiently high flow rate under the upstream pressure P of the gas flowing in the upstream space Y near the predetermined residual pressure to be retained (hereafter, retaining pressure).

More specifically, when the gas remaining in the container decreases to reduce the upstream pressure to near the predetermined pressure as described above, the spring force of the first coil spring 220 moves the check valve 230 toward the valve-closed position to reduce the flow channel area. The reduced flow channel area can cause an insufficient flow rate of gas, which may stop the equipment using the gas. However, the flow area remains sufficient because the gas can flow through the communication hole 216 in the check valve cylinder 210. This flow area achieves a sufficiently high flow rate under the upstream pressure near the retaining pressure.

The check valve case 260 mounted in the outlet secondary flow channel x and accommodating the check valve 230 and the first coil spring 220 enables the cassette structure of the non-return valve cassette 200, and facilitates the assembly of the consumption valve device 1, which then achieves a sufficiently high flow rate under the upstream pressure near the retaining pressure.

More specifically, the non-return valve cassette 200 can have the cassette structure accommodating the check valve 230 and the first coil spring 220 in the check valve case 260.

Additionally, the consumption valve device 1 including the non-return valve cassette 200 can be easily assembled by mounting the non-return valve cassette 200 with the cassette structure in the outlet secondary flow channel x.

The non-return valve cassette 200 is mounted together with the valve box 350 and the safety valve unit 400 functioning as a pressure reduction valve in the outlet secondary flow channel x, and thus the valve box 350 can reduce the gas pressure to a predetermined pressure and regulate the gas flow. This structure allows the consumption valve device 1 for high pressures to reliably retain a residual pressure at a predetermined pressure without upsizing, and achieves a sufficiently high flow rate under the upstream pressure near the predetermined pressure.

If an abnormality occurs in the valve box 350 and causes an insufficient reduction in the gas pressure, the safety valve unit 400 prevents damage by allowing the insufficiently pressure-reduced gas to flow in a secondary pipe connected to the consumption valve device 1 including the non-return valve cassette 200.

The safety valve unit 400 includes the relief valve 420 movable forward and backward between the safety valve-closed position and the safety valve-open position in the outlet secondary flow channel x, and movable backward to the safety valve-open position under the overpressure Po of the gas flowing upstream. The safety valve unit 400 also includes the third coil spring 430 with a spring force to bias the relief valve 420 in the safety valve-closing direction from the safety valve-open position to the safety valve-closed position, and to permit the relief valve 420 to move in the safety valve-opening direction from the safety valve-closed position to the safety valve-open position against the biasing in the valve-closing direction when the gas flowing upstream has a predetermined overpressure Po or greater. The relief valve 420 includes, in an area of the relief valve 420 at the safety valve-closed position communicating with the upstream space Y, the safety valve downstream end 422a for receiving a pressure in the safety valve-closing direction and having a smaller area than the safety valve upstream end 421a of the flange 421 for receiving a pressure in the safety valve-opening direction. This structure increases the flow rate of the safety valve unit 400 without upsizing the entire apparatus.

More specifically, the safety valve unit 400 includes the relief valve 420 movable forward and backward between the safety valve-closed position and the safety valve-open position in the outlet secondary flow channel x, and movable backward to the safety valve-open position under the overpressure Po of the gas flowing in the upstream space Y. The safety valve unit 400 also includes the third coil spring 430 with the spring force to bias the relief valve 420 in the safety valve-closing direction from the safety valve-open position to the safety valve-closed position, and to permit the relief valve 420 to move in the safety valve-opening direction from the safety valve-closed position to the safety valve-open position against the biasing in the valve-closing direction when the gas flowing upstream has the predetermined overpressure Po or greater. In the valve-closed state, the spring force of the third coil spring 430 in the safety valve-closing direction can maintain the relief valve 420 at the safety valve-closed position. Conversely, when the relief valve 420 receives the predetermined overpressure Po or greater, the relief valve 420 moves toward the safety valve-open position against the spring force of the third coil spring 430 to release gas.

In this state, the safety valve upstream end 421a of the flange 421 on the relief valve 420 receives the pressure in the safety valve-opening direction, and the third coil spring 430 is to hold the relief valve 420 at the safety valve-closed position against the pressure in the safety valve-opening direction. However, the safety valve downstream end 422a having a smaller area than the safety valve upstream end 421a of the flange 421 receives the pressure in the safety valve-closing direction.

In this manner, the relief valve 420 receives the overpressures Po in opposite directions, or the overpressure Po in the safety valve-opening direction to the safety valve upstream end 421a of the flange 421 and the overpressure Po in the safety valve-closing direction to the safety valve downstream end 422a, which cancel each other. The relief valve 420 thus receives the overpressure Po corresponding to the difference between the overpressure Po in the safety valve-opening direction to the safety valve upstream end 421a of the flange 421 and the overpressure Po in the safety valve-closing direction to the safety valve downstream end 422a. With the safety valve downstream end 422a having a smaller projected area than the safety valve upstream end 421a of the flange 421, the relief valve 420 receives the overpressure Po obtained by subtracting the overpressure Po in the safety valve-closing direction from the overpressure Po in the safety valve-opening direction, or specifically the overpressure Po in the safety valve-opening direction.

The third coil spring 430 thus simply has a spring force against the overpressure Po in the safety valve-opening direction to hold the relief valve 420 at the safety valve-closed position. The third coil spring 430 may simply have a spring force against the overpressure Po in the safety valve-opening direction. The third coil spring 430 may have a smaller spring force than a third coil spring 430 including the relief valve 420 with no through-hole 423, or the third coil spring 430 that simply receives the overpressure Po in the safety valve-opening direction. This structure increases the flow rate of the safety valve unit 400 without upsizing the entire apparatus.

The aspects of present invention correspond to the embodiment in the manner described below: the fluid in the aspects of the invention corresponds to the gas, the flow channel to the flow channel 60, the on-off valve to the intermediate transmission unit 54, the one-way valve device to the consumption valve device 1, downstream to the downstream side Dd, the mounting space to the outlet secondary flow channel x, the non-return valve mechanism to the non-return valve cassette 200, the regulator valve to the check valve 230, the biasing member to the first coil spring 220, the valve-opening directional end to the upstream end 232a, the valve-closing directional end to the downstream end 231a, the support to the check valve cylinder 210, the seal to the flange 252, the cylinder to the insertion cylinder 231, the through-hole to the combination of the through-hole 243 and the through-hole 253, the cylindrical accommodating portion to the accommodating space 211, the upstream end to the upstream end 232a, the downstream end to the downstream end 231a, the communication path to the communication hole 216, the cassette frame to the check valve case 260, the safety valve to the safety valve unit 400, the pressure reduction valve to the valve box 350, the safety valve biasing member to the third coil spring 430, the safety valve-opening directional end to the safety valve upstream end 421a of the flange 421, and the safety valve-closing directional end to the safety valve downstream end 422a. However, the aspects of the invention may be implemented in many embodiments other than the embodiment described above.

For example, the fluid that is a gas in the above embodiment may be a liquid or a gel.

Although the consumption valve device 1 in the above embodiment is mounted on the pipe p of the bundle V, the consumption valve device 1 may be mounted directly on the cylinder B.

The radial communication holes 268 may extend not only in the direction orthogonal to the consumption direction D but also in any direction intersecting with the consumption direction D.

The valve device dedicated to consumption in the above embodiment is the consumption valve device 1 including the combination valve mechanism 100, but may also be a valve device including a combination valve mechanism 100 for supplying fluid.

The downstream end 231a and the upstream end 232a of the check valve 230 may not be surfaces orthogonal to the consumption direction D but may be any surfaces nonparallel with and intersecting with the consumption direction D. In this case, the areas compared to calculate the pressure difference may be areas projected in the direction orthogonal to the consumption direction D. Each of the downstream end 231a and the upstream end 232a may be a combination of surfaces provided across different positions.

Similarly, the safety valve upstream end 421a and the safety valve downstream end 422a of the relief valve 420 may not be surfaces orthogonal to the consumption direction D but may be any surfaces nonparallel with and intersecting with the consumption direction D. In this case, the areas compared to calculate the pressure difference may be areas projected in the direction orthogonal to the consumption direction D. Each of the safety valve upstream end 421a and the safety valve downstream end 422a may be a combination of surfaces provided across different positions.

In the above embodiment, the combination valve mechanism 100 is assembled with the non-return valve cassette 200 and the pressure reduction safety valve cassette 300 and then the combination valve mechanism 100 is mounted on the consumption valve device 1. However, the non-return valve cassette 200 and the pressure reduction safety valve cassette 300 may be separately mounted on the consumption valve device 1. In some embodiments, the non-return valve cassette 200 alone may be mounted on the consumption valve device 1.

REFERENCE SIGNS LIST 1 consumption valve device
54 intermediate transmission unit
60 flow channel
200 non-return valve cassette
210 check valve cylinder
211 accommodating space
216 communication hole
220 first coil spring
240 check valve
241 insertion cylinder
242 flange
243 through-hole
251 insertion cylinder
252 flange
253 through-hole
260 check valve case
350 valve box
400 safety valve unit
421 flange
422 insertion cylinder
430 third coil spring
Dd downstream side
Du upstream side
X outlet secondary flow channel

The invention claimed is:
1. A non-return valve mechanism mountable on a one-way valve device to regulate flow of a fluid, the one-way valve device including a flow channel in which the fluid flows and an on-off valve located in a middle portion of the flow channel and switchable between an open state and a closed state, the non-return valve mechanism being mountable in a mounting space located downstream from the on-off valve in the flow channel of the one-way valve device, the non-return valve mechanism comprising:
a regulator valve movable forward and backward between a valve-closed position and a valve-open position in the mounting space, and movable backward to the valve-open position under pressure of the fluid flowing upstream;
a biasing member with a spring force to bias the regulator valve in a valve-closing direction from the valve-open position to the valve-closed position, and to permit the regulator valve to move in a valve-opening direction from the valve-closed position to the valve-open position against the biasing in the valve-closing direction when the fluid flowing upstream has a predetermined pressure or greater;
a support supporting the regulator valve in a movable manner; and
a valve case accommodating the regulator valve, the biasing member, and the support in an interior space of the valve case,
wherein the regulator valve includes, in an area of the regulator valve at the valve-closed position communicating with an upstream space, a valve-closing directional distal end for receiving a pressure in the valve-closing direction and having a smaller projected area in an opening and closing direction than a valve-opening directional distal end for receiving a pressure in the valve-opening direction,
wherein an outer diameter of the valve-closing directional distal end is smaller than an outer diameter of the valve-opening directional distal end,
wherein:
the biasing member biases the regulator valve in the valve-closing direction under a reaction force from the support;
the regulator valve includes a first seal ring configured to seal a smaller-diameter channel portion of the flow channel at the valve-closed position, and a cylinder located downstream from the first seal ring, and has a through-hole extending in the opening and closing direction through the first seal ring and the cylinder;
the support includes a cylindrical accommodating portion accommodating the cylinder in a manner to move the cylinder forward and backward;
the valve-opening directional distal end includes an upstream end of the first seal ring; and
the valve-closing directional distal end includes a downstream end of the cylinder accommodated in the cylindrical accommodating portion,
wherein the through hole has a first opening at the valve-opening directional distal end and a second opening at the valve-closing directional distal end, and
the through hole includes a central axis of the cylinder in entirety of the through hole between the first opening and the second opening, and wherein:
the regulator valve comprises a valve body having a flange, a seal seat, and a second seal ring having an outer diameter larger than that of the first seal ring; and
the second seal ring is accommodated inside the flange, and
wherein: on a cross-section including and along the central axis of the cylinder, the second seal ring is surrounded by the flange and the seal seat, except a gap between the flange and the seal seat; and
the valve case comprises a ring-shaped edge protrusion protruding toward the interior space and being configured to abut the second seal ring exposed at the gap between the flange and the seal seat.

2. The non-return valve mechanism according to claim 1, wherein
the support has a communication path communicating between an upstream end and a downstream end of the support.

3. The non-return valve mechanism according to claim 1, further comprising:
a cassette frame mounted in the mounting space, the cassette frame accommodating the regulator valve and the biasing member.

4. The non-return valve mechanism according to claim 1, wherein
the non-return valve mechanism is mounted together with a pressure reduction valve mechanism and a safety valve mechanism in the mounting space.

5. The non-return valve mechanism according to claim 4, wherein
the safety valve mechanism includes
a safety valve movable forward and backward between a safety valve-closed position and a safety valve-open position in the mounting space, and movable backward to the safety valve-open position under overpressure of the fluid flowing upstream; and
a safety valve biasing member with a spring force to bias the safety valve in a safety valve-closing direction from the safety valve-open position to the safety valve-closed position, and to permit the safety valve to move in a safety valve-opening direction from the safety valve-closed position to the safety valve-open position against the biasing in the safety valve-closing direction when the fluid flowing upstream has a predetermined overpressure or greater,
wherein the safety valve includes, in an area of the safety valve at the safety valve-closed position communicating with an upstream space, a safety valve-closing directional end for receiving a pressure in the safety valve-closing direction and having a smaller area than a safety valve-opening directional end for receiving a pressure in the safety valve-opening direction.

6. A one-way valve device including a flow channel in which a fluid flows and an on-off valve located in a middle portion of the flow channel and switchable between an open state and a closed state, the device comprising:
a non-return valve mechanism configured to regulate flow of the fluid, and mounted in a mounting space located downstream from the on-off valve in the flow channel of the one-way valve device,
wherein the non-return valve mechanism includes
a regulator valve movable forward and backward between a valve-closed position and a valve-open position in the mounting space, and movable backward to the valve-open position under a pressure of the fluid flowing upstream;

a biasing member with a spring force to bias the regulator valve in a valve-closing direction from the valve-open position to the valve-closed position, and to permit the regulator valve to move in a valve-opening direction from the valve-closed position to the valve-open position against the biasing in the valve-closing direction when the fluid flowing upstream has a predetermined pressure or greater;

a support supporting the regulator valve in a movable manner;

a valve case accommodating the regulator valve, the biasing member, and the support in an interior space of the valve case, wherein the regulator valve includes, in an area of the regulator valve at the valve-closed position communicating with an upstream space, a valve-closing directional distal end for receiving a pressure in the valve-closing direction and having a smaller projected area in an opening and closing direction than a valve-opening distal directional end for receiving a pressure in the valve-opening direction, wherein an outer diameter of the valve-closing directional distal end is smaller than an outer diameter of the valve-opening directional distal end, wherein:

the biasing member biases the regulator valve in the valve-closing direction under a reaction force from the support;

the regulator valve includes a first seal ring configured to seal a smaller-diameter channel portion of the flow channel at the valve-closed position, and a cylinder located downstream from the first seal ring, and has a through-hole extending in the opening and closing direction through the first seal ring and the cylinder;

the support includes a cylindrical accommodating portion accommodating the cylinder in a manner to move the cylinder forward and backward;

the valve-opening directional distal end includes an upstream end of the first seal ring; and the valve-closing directional distal end includes a downstream end of the cylinder accommodated in the cylindrical accommodating portion, and wherein the through hole has a first opening at the valve-opening directional distal end and a second opening at the valve-closing directional distal end, and the through hole includes a central axis of the cylinder in entirety of the through hole between the first opening and the second opening, and wherein:

the regulator valve comprises a valve body having a flange, a seal seat, and a second seal ring having an outer diameter larger than that of the first seal ring; and the second seal ring is accommodated inside the flange, and wherein: on a cross-section including and along the central axis of the cylinder, the second seal ring is surrounded by the flange and the seal seat, except a gap between the flange and the seal seat; and the valve case comprises a ring-shaped edge protrusion protruding toward the interior space and being configured to abut the second seal ring exposed at the gap between the flange and the seal seat.

7. The one-way valve device according to claim 6, wherein the support has a communication path communicating between an upstream end and a downstream end of the support.

8. The one-way valve device according to claim 6, further comprising:

a cassette frame mounted in the mounting space, the cassette frame accommodating the regulator valve and the biasing member.

9. The one-way valve device according to claim 6, wherein the one-way valve device is mounted together with a pressure reduction valve mechanism and a safety valve mechanism in the mounting space.

10. The one-way valve device according to claim 9, wherein the safety valve mechanism comprises:

a safety valve configured to be movable forward and backward between a safety valve-closed position and a safety valve-open position in the mounting space, and to be movable backward to the safety valve-open position under overpressure of the fluid flowing upstream; and a safety valve biasing member with a spring configured to bias the safety valve in a safety valve-closing direction from the safety valve-open position to the safety valve-closed position, and to permit the safety valve to move in a safety valve-opening direction from the safety valve-closed position to the safety valve-open position against the biasing in the safety valve-closing direction when the fluid flowing upstream has a predetermined overpressure or greater, wherein the safety valve includes, in an area of the safety valve at the safety valve-closed position communicating with an upstream space, a safety valve-closing directional end for receiving a pressure in the safety valve-closing direction and having a smaller area than a safety valve-opening directional end for receiving a pressure in the safety valve-opening direction.

* * * * *